United States Patent
Nagumo et al.

(10) Patent No.: US 11,489,955 B2
(45) Date of Patent: Nov. 1, 2022

(54) HANDS-FREE APPARATUS, METHOD OF DATA TRANSFER, AND COMPUTER-READABLE MEDIUM

(71) Applicant: Panasonic Intellectual Property Management Co., Ltd., Osaka (JP)

(72) Inventors: Akiyoshi Nagumo, Kanagawa Ken (JP); Hideki Tamura, Kanagawa Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/190,017

(22) Filed: Mar. 2, 2021

(65) Prior Publication Data

US 2021/0297521 A1    Sep. 23, 2021

(30) Foreign Application Priority Data

Mar. 18, 2020   (JP) .............................. JP2020-048464

(51) Int. Cl.
*H04M 1/60* (2006.01)
*H04W 4/16* (2009.01)
(Continued)

(52) U.S. Cl.
CPC ......... *H04M 1/6091* (2013.01); *H04M 1/575* (2013.01); *H04W 4/12* (2013.01);
(Continued)

(58) Field of Classification Search
CPC ........... H04M 1/6091; H04M 2250/02; H04M 1/6075; H04M 1/72412; H04M 2250/60; H04M 1/2757; H04M 1/575; H04M 1/57; H04M 1/6066; H04M 1/2746; H04M 1/72436; H04M 1/724; H04M 19/04; H04M 2250/74; H04M 1/663; H04M 1/27453; H04M 1/72409; H04M 15/00; H04M 1/006; H04M 1/2745; H04M 1/6041;
(Continued)

(56) References Cited

U.S. PATENT DOCUMENTS 8,855,614 B2* 10/2014 Varoglu .............. H04L 67/1095
                                                  455/414.3
2009/0209297 A1* 8/2009 Suzuki ................ H04M 1/6091
                                                  455/41.2
(Continued)

FOREIGN PATENT DOCUMENTS

JP      2002-193046     7/2002
JP      5582242         9/2014

*Primary Examiner* — Golam Sorowar
(74) *Attorney, Agent, or Firm* — Greenblum & Bernstein, P.L.C.

(57) ABSTRACT

A hands-free apparatus includes a memory, and a hardware processor coupled to the memory. The hardware processor is configured to: connect to a plurality of mobile phones to enable a hands-free telephone conversation; and receive at least one data among outgoing call history data, incoming call history data, missed call history data, and phonebook data stored in one mobile phone among the plurality of mobile phones. The hardware processor is configured to, when receiving the data from the one mobile phone, execute reception of the data from a second mobile phone at a prescribed timing.

12 Claims, 14 Drawing Sheets

(51) Int. Cl.
*H04M 1/57* (2006.01)
*H04W 4/12* (2009.01)

(52) U.S. Cl.
CPC .......... *H04W 4/16* (2013.01); *H04M 2250/02* (2013.01); *H04M 2250/60* (2013.01)

(58) Field of Classification Search
CPC ......... H04M 1/72442; H04M 1/72513; H04M 2250/12; H04M 3/42059; H04M 7/0057; H04M 1/00; H04M 1/2535; H04M 1/27457; H04M 1/2749; H04M 1/576; H04M 1/6505; H04M 1/667; H04M 1/675; H04M 1/72415; H04M 1/72445; H04M 1/72454; H04M 1/72463; H04M 1/72469; H04W 4/80; H04W 76/14; H04W 88/18; H04W 84/10; H04W 4/40; H04W 76/10; H04W 4/48; H04W 76/19; H04W 8/22; H04W 76/15; H04W 84/18; H04W 88/06; H04W 24/08; H04W 24/10; H04W 36/14; H04W 4/02; H04W 4/12; H04W 4/16; H04W 4/24; H04W 4/60; H04W 52/0229; H04W 52/0235; H04W 52/22; H04W 76/00; H04W 76/18; H04W 76/30; H04W 8/005; H04W 8/08; H04W 8/183; H04W 92/08; H04W 4/027; H04W 74/0875; H04W 8/205; H04W 88/02
See application file for complete search history.

(56) References Cited

U.S. PATENT DOCUMENTS

| | | | |
|---|---|---|---|
| 2009/0253467 A1* | 10/2009 | Saito | H04M 1/6091 455/569.2 |
| 2010/0197362 A1* | 8/2010 | Saitoh | H04M 1/2757 455/569.2 |
| 2016/0007189 A1* | 1/2016 | Miura | H04M 1/72412 455/552.1 |

\* cited by examiner

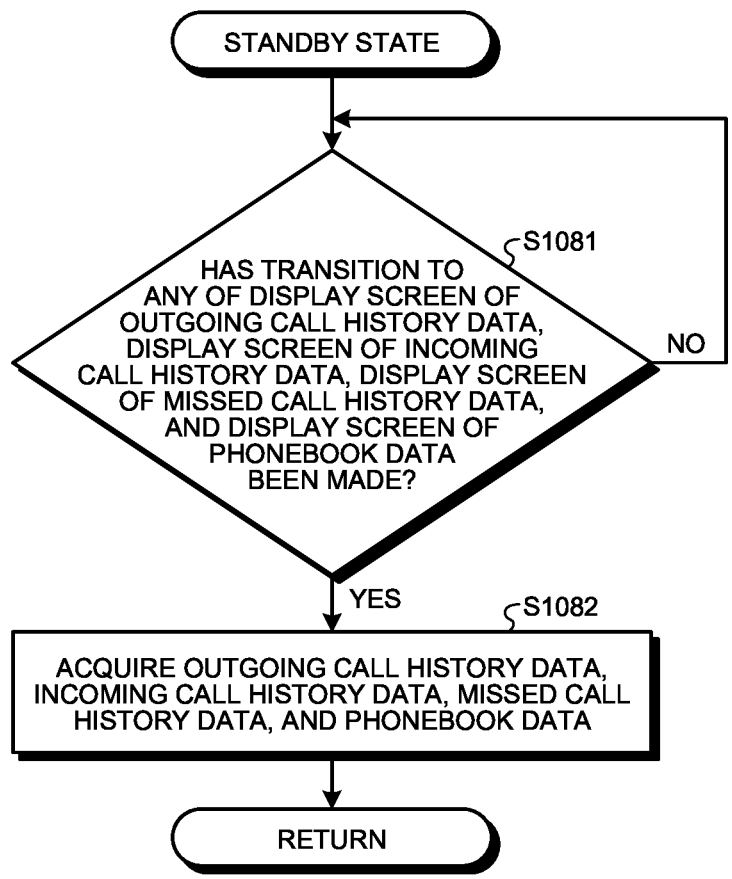

US 11,489,955 B2

HANDS-FREE APPARATUS, METHOD OF DATA TRANSFER, AND COMPUTER-READABLE MEDIUM

CROSS-REFERENCE TO RELATED APPLICATIONS

This application is based upon and claims the benefit of priority from Japanese Patent Application No. 2020-048464, filed on Mar. 18, 2020, the entire contents of which are incorporated herein by reference.

FIELD

The present disclosure relates generally to a hands-free apparatus, a method of data transfer, and a computer-readable medium.

BACKGROUND

Hands-free apparatuses that establish a communication line with a mobile phone and can thereby receive an incoming call and make an outgoing call even without a user having to directly operate the mobile phone have conventionally been known. Such a hands-free apparatus is installed in a vehicle, for example, and is used when the user holds a telephone conversation while driving.

In addition, technologies that transfer phonebook data and outgoing/incoming call history data from the mobile phone to the hands-free apparatus are known. Conventional technologies are described in Japanese Patent Application Laid-open No. 2002-193046, for example.

However, the conventional technologies do not sufficiently consider, when the hands-free apparatus simultaneously connects to a plurality of mobile phones, control of data transfer from the mobile phones to the hands-free apparatus.

The present disclosure provides a hands-free apparatus, a method of data transfer, and a computer-readable medium that can appropriately control data transfer timing when simultaneously connecting to a plurality of mobile phones.

SUMMARY

A hands-free apparatus according to the present disclosure includes a memory, and a hardware processor coupled to the memory. The hardware processor is configured to: connect to a plurality of mobile phones to enable a hands-free telephone conversation; and receive at least one data among outgoing call history data, incoming call history data, missed call history data, and phonebook data stored in one mobile phone among the plurality of mobile phones. The hardware processor is configured to, when receiving the data from the one mobile phone, execute reception of the data from a second mobile phone at a prescribed timing.

BRIEF DESCRIPTION OF THE DRAWINGS

FIG. 17 is a flowchart of another exemplary start timing of data transfer according to the sixth embodiment.

DETAILED DESCRIPTION

The following describes embodiments of a hands-free apparatus, a method of data transfer, and a computer-readable medium according to the present disclosure with reference to the accompanying drawings.

First Embodiment

Figure 1:
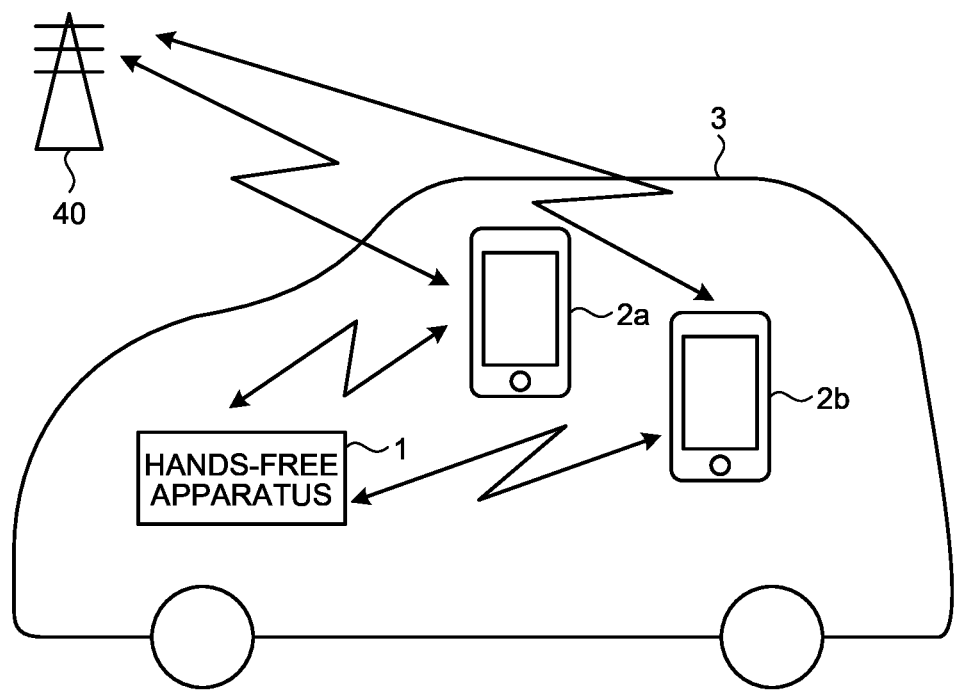
FIG. 1 is a diagram of an exemplary use mode of a hands-free apparatus according to a first embodiment.

FIG. 1 is a diagram of an exemplary use mode of a hands-free apparatus 1 according to the present embodiment. As illustrated in FIG. 1, the hands-free apparatus 1 of the present embodiment can be installed in a vehicle 3. The hands-free apparatus 1 is communicably connected with mobile phones 2a and 2b by near-field wireless communication means such as the Bluetooth (registered trademark) system.

The mobile phones 2a and 2b are smartphones, for example, and have a communication function based on the Bluetooth system as near-field wireless communication means. The mobile phone 2a is exemplary one mobile phone in the present embodiment. The mobile phone 2b is an exemplary second mobile phone in the present embodiment.

In the following, when the mobile phones 2a and 2b are not especially distinguished from each other, they are referred to simply as a mobile phone 2.

FIG. 1 illustrates an example in which the two mobile phones 2a and 2b connect to the hands-free apparatus 1; the number of the mobile phones 2 connecting to the hands-free apparatus 1 is not limited thereto.

The mobile phone 2 may be a mobile phone of a type other than the smartphone so long as it has a communication function based on the Bluetooth system.

The hands-free apparatus 1 connects to the mobile phone network via the mobile phone 2. Thus, a driver of the vehicle 3, for example, can make an outgoing call and receive an incoming call by operating the hands-free apparatus 1 even without operating the mobile phone 2. The hands-free apparatus 1 may be implemented as one function of an on-vehicle navigation apparatus installed in the vehicle 3, for example.

Figure 2:
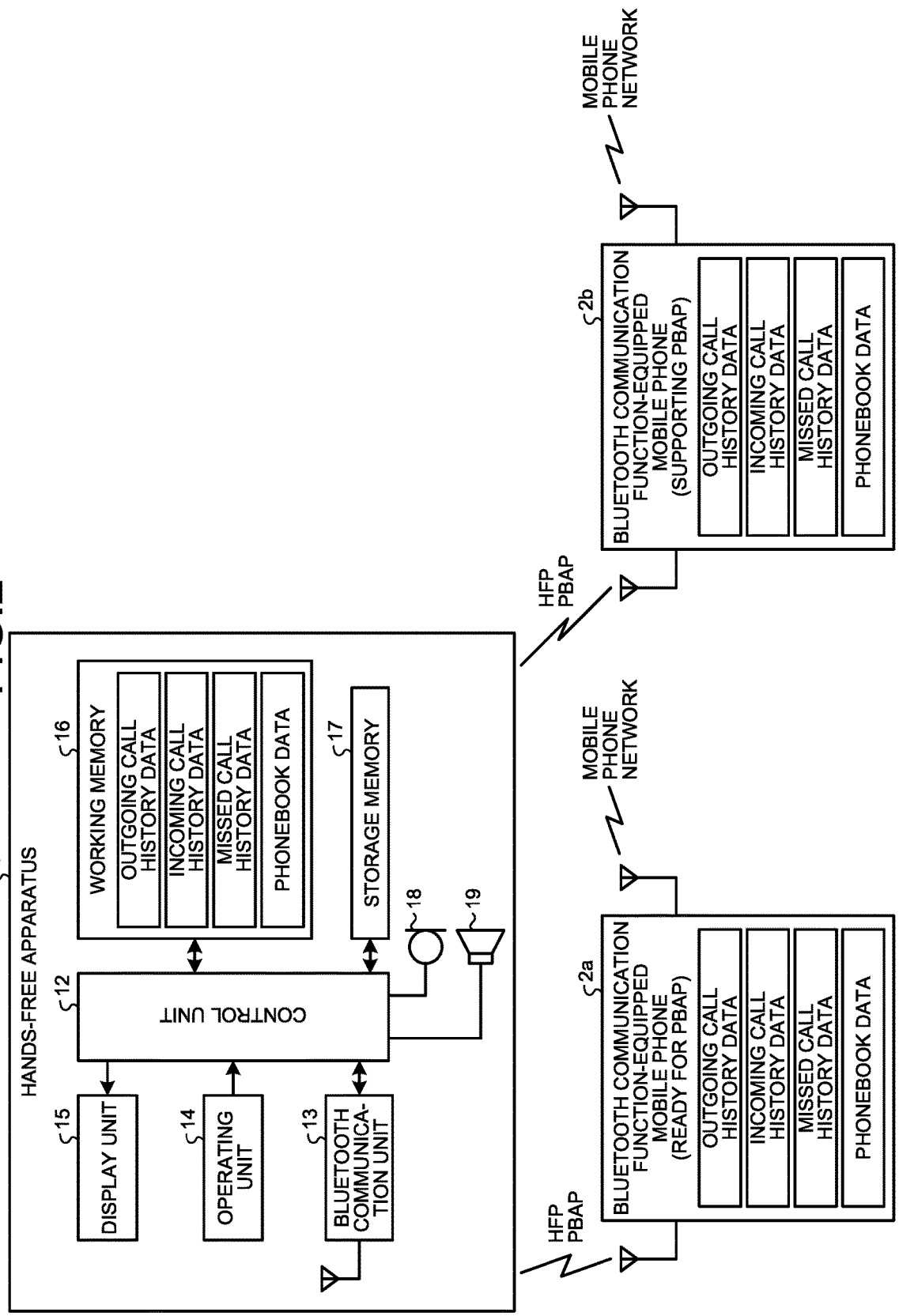
FIG. 2 is a diagram of an exemplary hardware configuration of the hands-free apparatus according to the first embodiment.

FIG. 2 is a diagram of an exemplary hardware configuration of the hands-free apparatus 1 according to the present embodiment. The hands-free apparatus 1 according to the present embodiment is a hands-free function-equipped on-vehicle navigation apparatus, for example. The hands-free apparatus 1 includes a control unit 12, a Bluetooth communication unit 13, an operating unit 14, a display unit 15, a working memory 16, a storage memory 17, a microphone 18, and a speaker 19.

The control unit 12 controls the entire operation such as communication operation and data management operation of the hands-free apparatus 1. The control unit 12 is a processor such as a central processing unit (CPU), for example.

The Bluetooth communication unit 13 is ready for the Bluetooth system as near-field wireless communication means and establishes a wireless communication line with the mobile phone 2 present within a Bluetooth wireless communication range to perform communication pursuant to Bluetooth communication standards. In this case, it is assumed that the mobile phone 2 has a Bluetooth communication function and is present within the Bluetooth wireless communication range of the hands-free apparatus 1.

The Bluetooth communication unit 13 in the present embodiment is ready for known Hands Free Profile (HFP) for holding a hands-free telephone conversation and Phone Book Access Profile (PBAP) for performing transfer of phonebook data and transfer of outgoing/incoming call history data. These profiles mean communication protocols defined for respective functions.

As is known, the mobile phone 2, on its own (in a state not connecting HFP with the hands-free apparatus 1 as a hands-free device), establishes a mobile phone line with a base station 40 of the mobile phone network and can perform outgoing call processing and incoming call processing on its own. In this case, as the outgoing call processing, when a user operates dial keys ("0" to "9" numeric keys) (not illustrated) to input a telephone number of an outgoing call destination and then operates an outgoing call key (not illustrated), for example, the mobile phone 2 can make an outgoing call with the telephone number as the outgoing call destination and hold a telephone conversation with a mobile phone of the outgoing call destination.

As the incoming call processing, upon reception of an incoming call signal from the base station 40 in accordance with the fact that a mobile phone of an outgoing call source has made an outgoing call with the mobile phone 2 as an outgoing call destination, the mobile phone 2 receives the telephone number of the mobile phone of the outgoing call source as an incoming call telephone number from the base station 40 and, when the user operates an incoming call key (not illustrated), can respond to the mobile phone of the outgoing call source and can hold a telephone conversation with the mobile phone of the outgoing call source.

The mobile phone 2 has a timepiece unit (not illustrated) measuring a date and time and stores therein, with correspondence between an outgoing telephone number input from the dial keys in the outgoing call processing described above and an outgoing call date and time based on the date and time measured by the timepiece unit as one data, a plurality of outgoing call history data. The mobile phone 2 stores therein, with correspondence between an incoming call telephone number received from the base station 40 in the incoming call processing described above and an incoming call date and time based on the date and time measured by the timepiece unit as one data, a plurality of incoming call history data.

The mobile phone 2 stores therein, with correspondence between an incoming call telephone number received from the base station 40 when making no response to an incoming call and an incoming call date and time based on the date and time measured by the timepiece unit as one data, a plurality of missed call history data. Further, the mobile phone 2 holds, with correspondence between a telephone number and a registered name as one data, a plurality of phonebook data. The phonebook data, to which the user inputs telephone numbers and registered names, stores about 500 telephone numbers and registered names, for example, in association with each other in a non-volatile memory (not illustrated).

When the mobile phone 2 has the phonebook data, the outgoing call history data and the incoming call history data include the registered names. Specifically, the incoming call telephone number received from the base station 40 is a telephone number registered in the phonebook data, and the mobile phone 2 checks whether a registered name is registered for this telephone number in the phonebook data; if it is present, the incoming call history data includes the telephone number, the incoming date and time, and the registered name. The missed call history data also includes the telephone number, the incoming date and time, and the registered name through similar processing. Also for the outgoing call history data, the mobile phone 2 checks whether the telephone number with which the outgoing call has been made in the outgoing call processing is a telephone number registered in the phonebook data. When the telephone number is registered in the phonebook data, the outgoing call history data includes the outgoing call date and time, the outgoing call telephone number, and the registered name.

The user selects one telephone number read from the phonebook data by the mobile phone 2 and makes an outgoing call and can thereby make an outgoing call by a simple operation without errors even without having to input all numeric keys corresponding to the numbers forming the telephone number one by one. The mobile phone 2 can store therein the latest 20 pieces each of the outgoing call history data, the incoming call history data, and the missed call history data, for example, and automatically deletes the oldest data each time the outgoing call processing, the incoming call processing, or missed call is performed to update the outgoing call history data, the incoming call history data, and the missed call history data. The mobile phone 2 is ready for known HFP for holding a hands-free telephone conversation and PBAP for performing transfer of the phonebook data and transfer of the outgoing/incoming call history data.

The mobile phone 2, when being ready for PBAP prescribing automatic transfer of the outgoing/incoming call history data, connects PBAP immediately after the communication line is established with the Bluetooth communication unit 13, automatically transfer the phonebook data stored at the point in time, and further automatically transfer the outgoing call history data, the incoming call history data, and the missed call history data stored at the point in time. Thus, when the hands-free apparatus 1 is present within the Bluetooth communication range, the mobile phone 2 automatically transfers a maximum of 20 outgoing call history data stored by performing the outgoing call processing in the past on its own, a maximum of 20 incoming call history data stored by performing the incoming call processing in the past on its own, and a maximum of 20 missed call history data stored by performing missed call processing in the past on its own to the hands-free apparatus 1.

In the present embodiment, when the outgoing call history data, the incoming call history data, and the missed call history data are collectively referred to, they are referred to simply as history data.

The mobile phone 2, when a communication state has changed while being Bluetooth-connected with the hands-free apparatus 1, transmits a notification indicating the change in the communication state to the hands-free apparatus 1. The communication state of the mobile phone 2 indicates a state of receiving an incoming call, making an outgoing call, and an incoming call standby, for example. Examples of the case when the communication state has changed include a case when the mobile phone 2 has made or received an outgoing call or an incoming call via the mobile phone network and a case returning to a standby state from making an outgoing call or receiving an incoming call. Also when the contents within the phonebook data have been changed by the user in the mobile phone 2, the mobile phone 2 may transmit the notification indicating the change in the communication state to the hands-free apparatus 1. The notification is transmitted by a system pursuant to HFP, for example.

The notification that an incoming call has been received includes an missed call. The outgoing call or the incoming call of the mobile phone 2 may be performed by operating the mobile phone 2 by the user or a hands-free telephone conversation performed by the user using the hands-free apparatus 1.

The operating unit 14 of the hands-free apparatus 1 is an operating means for the user to operate, includes touch keys formed in the display unit 15, for example, detects an operation by the user, and outputs an operating signal representing its operation details to the control unit 12.

The display unit 15 is a display means, and upon input of a display signal from the control unit 12, displays a display screen based on the input display signal, and displays a display screen on which dial keys corresponding to "0" to "9" are arranged as a display screen for the user to input a telephone number, for example. The display unit 15 is a liquid crystal display or an electro luminescence (EL) display, for example, but is not limited thereto.

The working memory 16 is an outgoing call history data storage means, an incoming call history data storage means, and a data storage means referred to in the present embodiment and includes a volatile memory. The working memory 16 stores therein the outgoing call history data, the incoming call history data, the missed call history data, and the phonebook data automatically transferred from the mobile phone 2 without involving any user operation. In this case, the working memory 16 can store therein five pieces each of the outgoing call history data, the incoming call history data, and the missed call history data, for example. The working memory 16 is a random access memory (RAM), for example.

The storage memory 17 includes a non-volatile memory and stores therein various kinds of data. The storage memory 17 is a read only memory (ROM), for example. The storage memory 17 may be a writable storage medium such as a hard disk drive (HDD) or a flash memory.

The control unit 12 causes the display unit 15 to display the outgoing call history data stored in the working memory 16 when the user makes a request to display the outgoing call history data with the operating unit 14, causes the display unit 15 to display the incoming call history data stored in the working memory 16 when the user makes a request to display the incoming call history data with the operating unit 14, and causes the display unit 15 to display the phonebook data stored in the working memory 16 when the user makes a request to display the phonebook data with the operating unit 14. As described above, the hands-free apparatus 1 of the present embodiment has five pieces each of the outgoing call history data and the incoming call history data stored in the working memory 16 and has five pieces each of them at the maximum displayed on the display unit 15. The number of these data stored in the working memory 16 is by way of example, and the above example is not limited thereto.

The microphone 18 is a voice input means inputting voices and receives input of voices emitted by the user when holding a hands-free telephone conversation using the mobile phone 2. The speaker 19 is a voice output means and outputs received voices of a telephone conversation counterpart when holding a hands-free telephone conversation using the mobile phone 2. That is to say, when a Bluetooth communication line is established between the Bluetooth communication unit 13 and the mobile phone 2 to connect HFP-based wireless communication, the control unit 12 transmits the voices input by the microphone 18 from the Bluetooth communication unit 13 to the mobile phone 2 to transmit them from the mobile phone 2 to the mobile phone network and receives voices received from the mobile phone network by the mobile phone 2 from the mobile phone 2 to the Bluetooth communication unit 13 to output them from the speaker 19.

The hands-free apparatus 1 described above may also include functional blocks required for navigation operation such as a global positioning system (GPS) apparatus as a current position detector detecting a current position of the vehicle, a route search unit searching for a route from the current position to a destination, a map data reading unit reading map data from a recording medium recording the map data, a VICS information reception unit receiving VICS information distributed from a VICS (registered trademark) center, and a voice recognition unit voice-recognizing voices emitted by the user apart from the illustrated functional blocks. In this case, the hands-free apparatus 1 may extract GPS date and time information from a GPS wireless signal received by the GPS apparatus from GPS satellites to acquire a date and time and use the acquired date and time as the outgoing call date and time or the incoming call date and time.

The hands-free apparatus 1 described above is configured to start up and stop in conjunction with the on and off of an ACC switch (a switch turning on and off power supply to vehicle devices). When the ACC switch is switched from on to off in accordance with an operation by the user, for example, power supply to the hands-free apparatus 1 is stopped, and consequently, its apparatus power supply shifts from on to off. In this case, although the various kinds of data stored in the storage memory 17 immediately therebefore is not deleted (is stored), the outgoing call history data, the incoming call history data, the missed call history data, and the telephone directly data stored in the working memory 16 immediately therebefore are deleted.

Figure 3:
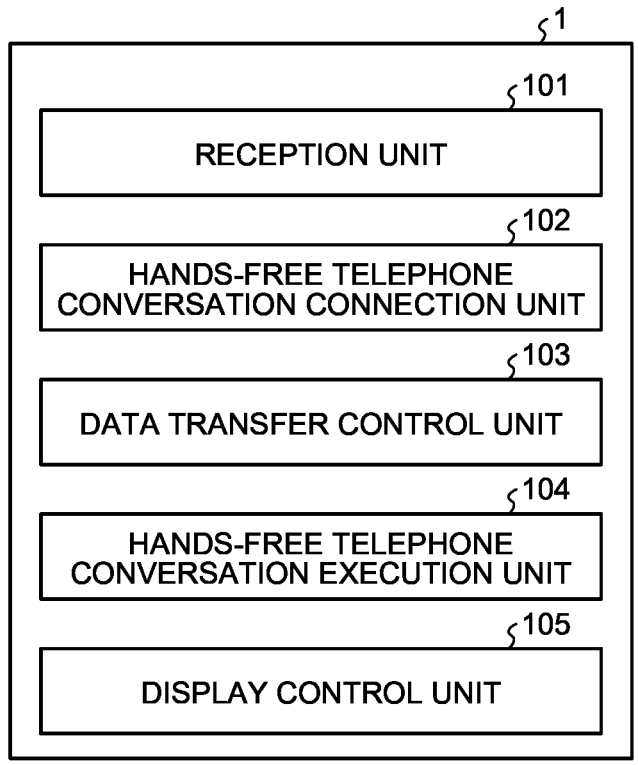
FIG. 3 is a diagram of exemplary functions included in the hands-free apparatus according to the first embodiment.

The following describes details of the functions of the hands-free apparatus 1 of the present embodiment. FIG. 3 is a diagram of exemplary functions included in the hands-free apparatus 1 according to the present embodiment. As illustrated in FIG. 3, the hands-free apparatus 1 of the present embodiment includes a reception unit 101, a hands-free telephone conversation connection unit 102, a data transfer control unit 103, a hands-free telephone conversation execution unit 104, and a display control unit 105.

The reception unit 101, the hands-free telephone conversation connection unit 102, the data transfer control unit 103, the hands-free telephone conversation execution unit 104, and the display control unit 105 are implemented by reading a computer program from the storage memory 17 and executing it by the control unit 12. The functions illustrated in FIG. 3 are by way of example; the control unit 12 of the hands-free apparatus 1 may further implement other functions.

The reception unit 101 receives various kinds of operations from the user. When the user operates the operating unit 14, for example, the reception unit 101 receives the operation by the user via the operating unit 14.

The hands-free telephone conversation connection unit 102 connects to the mobile phones 2 to enable a hands-free telephone conversation pursuant to HFP. More specifically, the hands-free telephone conversation connection unit 102 controls the Bluetooth communication unit 13 to connect to the mobile phones 2 to enable a hands-free telephone conversation.

The data transfer control unit 103 receives at least one of the outgoing call history data, the incoming call history data, the missed call history data, and the phonebook data stored in the mobile phone 2 from the mobile phone 2 by a communication protocol pursuant to PBAP. In the present embodiment, the data transfer control unit 103 receives all the outgoing call history data, the incoming call history data, the missed call history data, and the phonebook data from the mobile phone 2. The data transfer by the communication protocol pursuant to PBAP is only by way of example, and the protocol for use in the transfer processing is not limited to the communication protocol pursuant to PBAP.

The data transfer control unit 103 stores the outgoing call history data, the incoming call history data, the missed call history data, and the phonebook data received from the mobile phone 2 in the working memory 16. When the storage memory 17 is a writable storage medium such as an HDD or a flash memory, the data transfer control unit 103 may store the outgoing call history data, the incoming call history data, the missed call history data, and the phonebook data received from the mobile phone 2 in the storage memory 17.

The data transfer control unit 103, while receiving the outgoing call history data, the incoming call history data, the missed call history data, or the phonebook data from any of the mobile phones 2, or the mobile phone 2a, for example, executes reception of these history data and the phonebook data from the second mobile phone 2b at a prescribed timing.

"While receiving the history data or the phonebook data" indicates that the data transfer control unit 103 is receiving at least one of the outgoing call history data, the incoming call history data, the missed call history data, and the phonebook data. In this case, the data transfer control unit 103 may be receiving two or more data among the outgoing call history data, the incoming call history data, the missed call history data, and the phonebook data simultaneously or successively.

The data transfer control unit 103 determines the prescribed timing at which the history data or the phonebook data is to be received from the mobile phone 2b in accordance with communication states of the mobile phone 2a and the mobile phone 2b.

In the present embodiment, the prescribed timing is after the reception of the history data or the phonebook data from the mobile phone 2a has ended, for example. That is to say, as an example, it is determined in advance that after the reception of the history data or the phonebook data from the mobile phone 2a has ended, the reception of the history data or the phonebook data from the mobile phone 2b is executed, and the data transfer control unit 103, when the reception of the history data or the phonebook data from the mobile phone 2a has ended, determines that it is the prescribed timing at which the history data or the phonebook data is to be received from the mobile phone 2b (judges that the it is the prescribed timing at which execution of the reception of the data from the mobile phone 2b is to be started), for example.

The data transfer control unit 103 of the present embodiment basically receives the history data or the phonebook data when the communication state of the mobile phone 2 connecting to the hands-free apparatus 1 by the Bluetooth system has changed. The data transfer control unit 103 of the present embodiment, when receiving the notification indicating the change in the communication state from the mobile phone 2, transmits a data transfer request for requesting start of transfer of the history data and the phonebook data to the mobile phone 2 as a transmission source of the notification, for example. In other words, the notification is a notification as a trigger of the data transfer. The data transfer control unit 103 may request transfer of the outgoing call history data, the incoming call history data, the missed call history data, and the phonebook data or request transfer of any data among them in accordance with the contents of the notification.

The data transfer control unit 103 of the present embodiment gives priority to data reception from the mobile phone 2 that has started data transfer processing that had been started earlier over data reception from the second mobile phone 2 that has changed its communication state after the start of the data transfer processing.

More specifically, the data transfer control unit 103, when receiving a notification that an outgoing call or an incoming call has been made or received from the mobile phone 2b while receiving the history data or the phonebook data from the mobile phone 2a, receives the history data or the phonebook data from the mobile phone 2b after the reception of the history data or the phonebook data from the mobile phone 2a has ended. When the history data and the phonebook data are successively transferred from the mobile phone 2a to the hands-free apparatus 1, the data transfer control unit 103 receives the history data or the phonebook data from the mobile phone 2b after the reception of all the history data and the phonebook data successively transferred has ended.

The data transfer control unit 103, even when an HFP-based hands-free telephone conversation is being executed by the hands-free telephone conversation execution unit 104 described below, can concurrently execute the reception of the history data or the phonebook data.

The hands-free telephone conversation execution unit 104, when the mobile phone 2 HFP-connected by the hands-free telephone conversation connection unit 102 has received an incoming call, executes a hands-free telephone conversation. The hands-free telephone conversation execution unit 104 receives received voices of a telephone conversation counterpart received by the mobile phone 2 via the Bluetooth communication unit 13 to output the received voices from the speaker 19, for example. The hands-free telephone conversation execution unit 104 transmits voices input to the microphone 18 by the user of the hands-free apparatus 1 from the Bluetooth communication unit 13 to the mobile phone 2 to transmit them from the mobile phone 2 to the mobile phone network.

In the present embodiment, the hands-free apparatus 1 can simultaneously connect to the mobile phones 2. The hands-free telephone conversation execution unit 104, while executing a hands-free telephone conversation based on an incoming call received by any mobile phone 2 among the mobile phones 2 HFP-connected to the hands-free apparatus 1, does not execute a hands-free telephone conversation based on an incoming call received by the second mobile phone 2.

The hands-free telephone conversation execution unit 104 can execute the HFP-based hands-free telephone conversation even when PBAP by the data transfer control unit 103 is being executed. More specifically, the hands-free telephone conversation execution unit 104, when one mobile phone 2, or the mobile phone 2a, for example, among the mobile phones 2 PBAP-connected to the hands-free apparatus 1 is transferring the history data or the phonebook data to the hands-free apparatus 1, and when the second mobile phone 2b has received an incoming call, executes a hands-free telephone conversation of the incoming call received by the second mobile phone 2b.

The display control unit 105 causes the display unit 15 to display various kinds of screens. The display control unit 105 causes the display unit 15 to display a display screen on which dial keys are arranged as a display screen for a user to input a telephone number, for example. The display control unit 105 causes the display unit 15 to display the outgoing call history data, the incoming call history data, the missed call history data, or the phonebook data in accordance with an operation by the user received by the reception unit 101.

The following describes a procedure of processing to be executed by the hands-free apparatus 1 and the mobile phones 2a and 2b described above.

Figure 4:
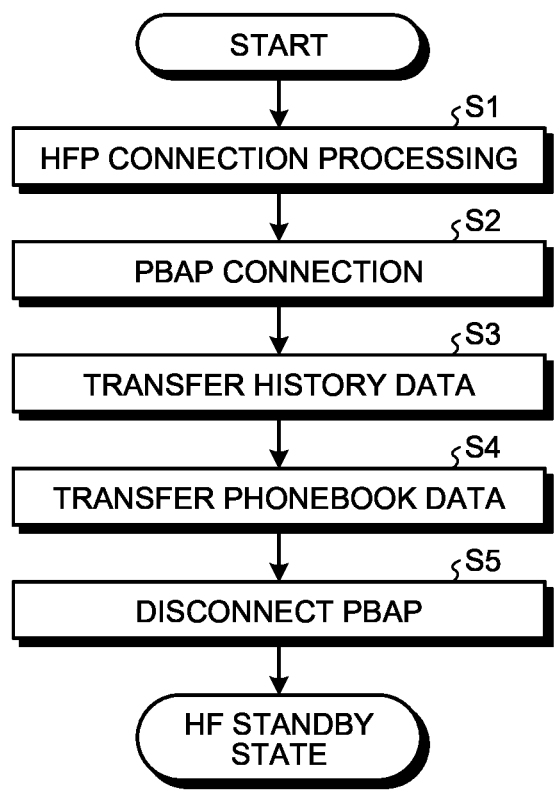
FIG. 4 is a flowchart of an exemplary procedure of initial data transfer to be executed by the hands-free apparatus and a mobile phone according to the first embodiment.

FIG. 4 is a flowchart of an exemplary procedure of initial data transfer processing to be executed by the hands-free apparatus 1 and the mobile phone 2 according to the present embodiment. As an assumption of the processing of FIG. 4, the mobile phone 2 has already held (stored therein) 20 outgoing call history data as a maximum storable number, 20 incoming call history data as a maximum storable number, and 20 missed call history data as a maximum storable number. It is assumed that the mobile phone 2 is positioned within the Bluetooth communication range of the hands-free apparatus 1.

First, the hands-free telephone conversation connection unit 102 executes processing to perform HFP connection to the mobile phone 2 positioned within the Bluetooth communication range (S1). The hands-free telephone conversation connection unit 102 may tray the HFP connection successively to the mobile phones 2 registered in advance, for example.

Next, the data transfer control unit 103 performs PBAP connection to the mobile phone 2 HFP-connected by the hands-free telephone conversation connection unit 102 (S2).

Next, the data transfer control unit 103 transmits a history data transfer request to start processing to transfer the outgoing call history data, the incoming call history data, and the missed call history data to the mobile phone 2 to start history data transfer processing (S3).

The mobile phone 2 that has received the history data transfer request transmits the outgoing call history data, the incoming call history data, and the missed call history data to the hands-free apparatus 1 by Bluetooth communication pursuant to PBAP. The data transfer control unit 103 stores the outgoing call history data, the incoming call history data, and the missed call history data transferred from the mobile phone 2 in the working memory 16 or the storage memory 17.

Upon ending the processing to transfer the history data, the data transfer control unit 103 transmits a phonebook data transfer request to start processing to transfer the phonebook data to the mobile phone 2 to start the processing to transfer the phonebook data (S4).

The mobile phone 2 that has received the phonebook data transfer request transfers the phonebook data to the hands-free apparatus 1 by Bluetooth communication pursuant to PBAP. The data transfer control unit 103 stores the phonebook data transferred from the mobile phone 2 in the working memory 16 or the storage memory 17.

Upon ending the initial data transfer processing by the data transfer control unit 103, the data transfer control unit 103 disconnects the PBAP connection with the mobile phone 2 (S5). The data transfer control unit 103 executes PABP connection disconnection processing when being notified that all the data to be transferred has been transferred from the mobile phone 2, for example. In this process, the mobile phone 2 also executes PABP connection disconnection processing with the hands-free apparatus 1.

The hands-free apparatus 1 shifts to a hands-free (HF) standby state. In the present embodiment, the hands-free standby state refers to a state in which the hands-free apparatus 1 is being HFP-connected to the mobile phone 2 and is not holding a hands-free telephone conversation. In the present embodiment, in the hands-free standby state, the hands-free apparatus 1 disconnects the PBAP connection with the mobile phone 2; also after the initial data transfer processing, the PBAP connection may be continued.

The processing illustrated in the flowchart of FIG. 4 is executed between the hands-free apparatus 1 and each of the mobile phones 2a and 2b.

The following describes a data transfer timing, when one mobile phone 2, or the mobile phone 2a, for example, is under data transfer, of the second mobile phone 2a.

Figure 5:
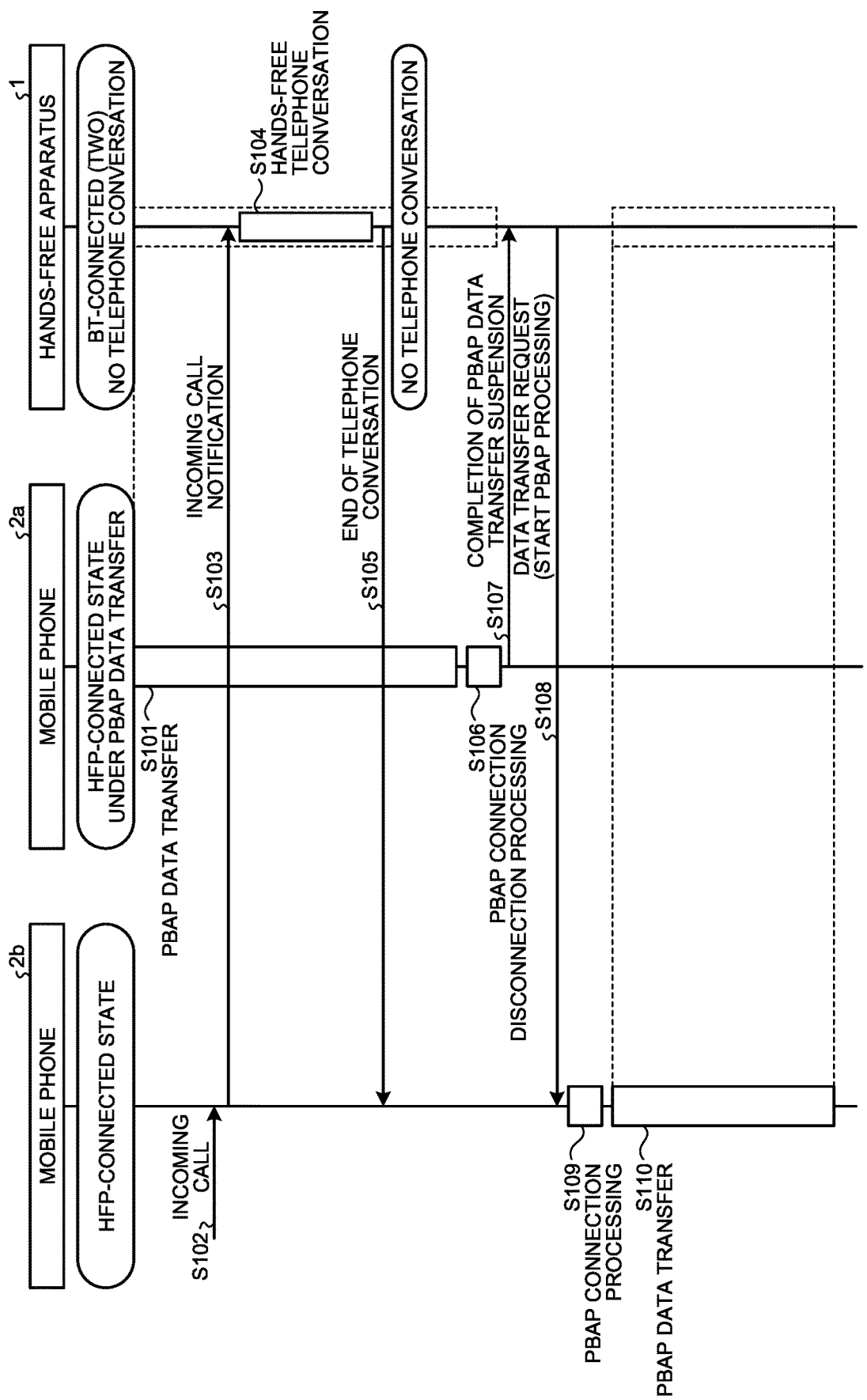
FIG. 5 is a sequence diagram of an exemplary procedure of processing to be executed by the hands-free apparatus and mobile phones according to the first embodiment.

FIG. 5 is a sequence diagram of an exemplary procedure of processing to be executed by the hands-free apparatus 1 and the mobile phones 2a and 2b according to the present embodiment. As an assumption of the processing of FIG. 5, the mobile phones 2a and 2b are positioned within the Bluetooth communication range of the hands-free apparatus 1. The hands-free apparatus 1 is being HFP-connected to the two mobile phones 2a and 2b and is not holding any hands-free telephone conversation.

At a starting point in time of the processing illustrated in FIG. 5, the mobile phone 2a is executing PABP-based data transfer processing with the hands-free apparatus 1 (S101).

The data transfer processing may be the initial data transfer processing illustrated in FIG. 4, for example. During the execution of the processing at S101, the data transfer control unit 103 of the hands-free apparatus 1 is receiving the history data or the phonebook data from the mobile phone 2a.

Now the mobile phone 2b receives an incoming call via the mobile phone network (S102). In this case, the mobile phone 2b transmits a notification indicating a communication state of having received an incoming call to the hands-free apparatus 1 (S103). In this case, the data transfer control unit 103 of the hands-free apparatus 1 stores the fact that the notification has been received in the working memory 16 or the storage memory 17.

The hands-free telephone conversation execution unit 104 of the hands-free apparatus 1 executes a hands-free telephone conversation of the incoming call received by the mobile phone 2b (S104).

When the user operates the operating unit 14 of the hands-free apparatus 1 to end the telephone conversation, for example, the hands-free telephone conversation execution unit 104 of the hands-free apparatus 1 notifies the mobile phone 2b of the end of the hands-free telephone conversation (S105). The mobile phone 2b may transmit the notification of the end of the telephone conversation to the hands-free apparatus 1. Also while the processing at S102 to S105 is being executed, the data transfer control unit 103, concurrently with this processing, continues the processing to receive the history data or the phonebook data from the mobile phone 2a.

The hands-free telephone conversation execution unit 104, when the hands-free telephone conversation via the mobile phone 2b has ended, if it is not receiving the history data or the phonebook data from the mobile phone 2a, starts processing to receive the history data or the phonebook data based on PBAP from the mobile phone 2b. In the processing of this sequence diagram, however, the history data or the phonebook data from the mobile phone 2a is being received, and thus the hands-free telephone conversation execution unit 104, also after the end of the hands-free telephone conversation via the mobile phone 2b, waits for the prescribed timing, that is, the end of the data transfer processing from the mobile phone 2a.

The mobile phone 2a, when transferring all the data to be transferred, disconnects the PBAP connection with the hands-free apparatus 1 (S106). The mobile phone 2a notifies the hands-free apparatus 1 of completion of PBAP-based data transfer processing (S107). In this case, the data transfer control unit 103 of the hands-free apparatus 1 disconnects the PABP connection with the mobile phone 2a.

The data transfer control unit 103 of the hands-free apparatus 1 transmits a data transfer request to the mobile phone 2b as a transmission source of the notification indicating the communication state of having received an incoming call in the processing at S103 to start PBAP-based data transfer processing (S108).

The data transfer control unit 103 searches the working memory 16 or the storage memory 17 for a notification received during the data transfer processing after the end of the data transfer processing with the mobile phone 2a and transmits a data transfer request to a transmission source of the notification, for example. When three or more mobile phones 2 are HFP-connected to the hands-free apparatus 1, when receiving notification from the mobile phones 2 during data transfer from one mobile phone 2, the data transfer control unit 103 may transmit the data transfer request to the mobile phones 2 in order of notification reception time.

The mobile phone 2b, when receiving the data transfer request from the hands-free apparatus 1, executes PBAP connection processing connecting to the hands-free apparatus 1 by PBAP (S109).

The mobile phone 2b executes PBAP data transfer processing to transfer the history data or the phonebook data to the hands-free apparatus 1 (S110). The data transfer at S110 is triggered by the reception of the incoming call by the mobile phone 2b, and thus only the incoming call history data may be transferred. Alternatively, the other history data and the phonebook data may be transferred. The data transfer control unit 103 of the hands-free apparatus 1 receives the data transferred from the mobile phone 2a. Now the processing of this sequence diagram ends.

Thus, the hands-free apparatus 1 of the present embodiment connects to the mobile phones 2 to enable a hands-free telephone conversation and, while receiving at least one data among the outgoing call history data, the incoming call history data, the missed call history data, and the phonebook data from the one mobile phone 2a, executes the reception of the data from the second mobile phone 2b at the prescribed timing. Thus, the hands-free apparatus 1 of the present embodiment can appropriately control data transfer timing when simultaneously connecting to the mobile phones 2.

The hands-free apparatus 1 of the present embodiment determines the prescribed timing at which the history data or the phonebook data is to be received from the mobile phone 2b in accordance with the communication states of the mobile phone 2a and the mobile phone 2b. When the communication state of the mobile phone 2 has changed by an incoming call or the like, the history data stored in the mobile phone 2 changes. Thus, the hands-free apparatus 1 of the present embodiment determines the prescribed timing at which the history data or the phonebook data is to be received from the mobile phone 2b in accordance with the communication states of the mobile phone 2a and the mobile phone 2b by an incoming call or the like and can thereby appropriately control the data transfer timing with the change in the history data or the like taken into account.

The hands-free apparatus 1 of the present embodiment, when receiving a notification that an outgoing call or an incoming call has been made or received from the second mobile phone 2b while receiving the history data or the phonebook data from the one mobile phone 2a, receives the history data or the phonebook data from the second mobile phone 2b after the reception of the history data or the phonebook data from the one mobile phone 2a has ended. Thus, the hands-free apparatus 1 of the present embodiment waits for the data transfer from the second mobile phone 2b until the completion of the data transfer started earlier and can thereby reduce a data amount transferred at once.

In the present embodiment, the hands-free apparatus 1 connects to the mobile phones 2 by HFP and PBAP; another communication protocol may be employed. The hands-free apparatus 1 and the mobile phones 2 may be connected to each other by a wireless communication standard other than Bluetooth.

In the present embodiment, the hands-free telephone conversation connection unit 102 and the hands-free telephone conversation execution unit 104 are described as different functional units; the hands-free telephone conversation connection unit 102 may include the function of the hands-free telephone conversation execution unit 104.

Second Embodiment

In this second embodiment, the hands-free apparatus 1, when receiving a notification as a trigger of data transfer from the second mobile phone 2b while receiving the history data or the phonebook data from the one mobile phone 2a, varies in a timing at which the data transfer processing is to be executed to the second mobile phone 2b in accordance with priorities of the one mobile phone 2a and the second mobile phone 2b.

A hardware configuration and a functional configuration of the hands-free apparatus 1 of the present embodiment are similar to those of the first embodiment described in FIGS. 2 and 3.

The reception unit 101 of the present embodiment receives registration of priorities of the data transfer of the mobile phones 2 from the user. The reception unit 101 stores the received priorities in the working memory 16 or the storage memory 17.

The data transfer control unit 103 of the present embodiment sets a prescribed timing at which the data transfer processing is to be executed to the second mobile phone 2b in accordance with the priorities of the one mobile phone 2a and the second mobile phone 2b and receives the data from the mobile phone 2b at the prescribed timing.

More specifically, the data transfer control unit 103, when receiving a notification that an outgoing call or an incoming call has been made or received from the second mobile phone 2b while receiving the history data or the phonebook data from the one mobile phone 2a, and when the priority of the one mobile phone 2a is lower than the priority of the second mobile phone 2b, suspends the reception of the history data or the phonebook data from the one mobile phone 2a and starts reception of the history data or the phonebook data from the second mobile phone 2b. The data transfer control unit 103 resumes the reception of the history data or the phonebook data from the one mobile phone 2a after the end of the reception of the history data or the phonebook data from the second mobile phone 2b.

The data transfer control unit 103, when receiving a notification that an outgoing call or an incoming call has been made or received from the second mobile phone 2b while receiving the history data or the phonebook data from the one mobile phone 2a, and when the priority of the one mobile phone 2a is higher than the priority of the second mobile phone 2b, receives the history data or the phonebook data from the second mobile phone 2b after the reception of the history data or the phonebook data from the one mobile phone 2a has ended.

Figure 6:
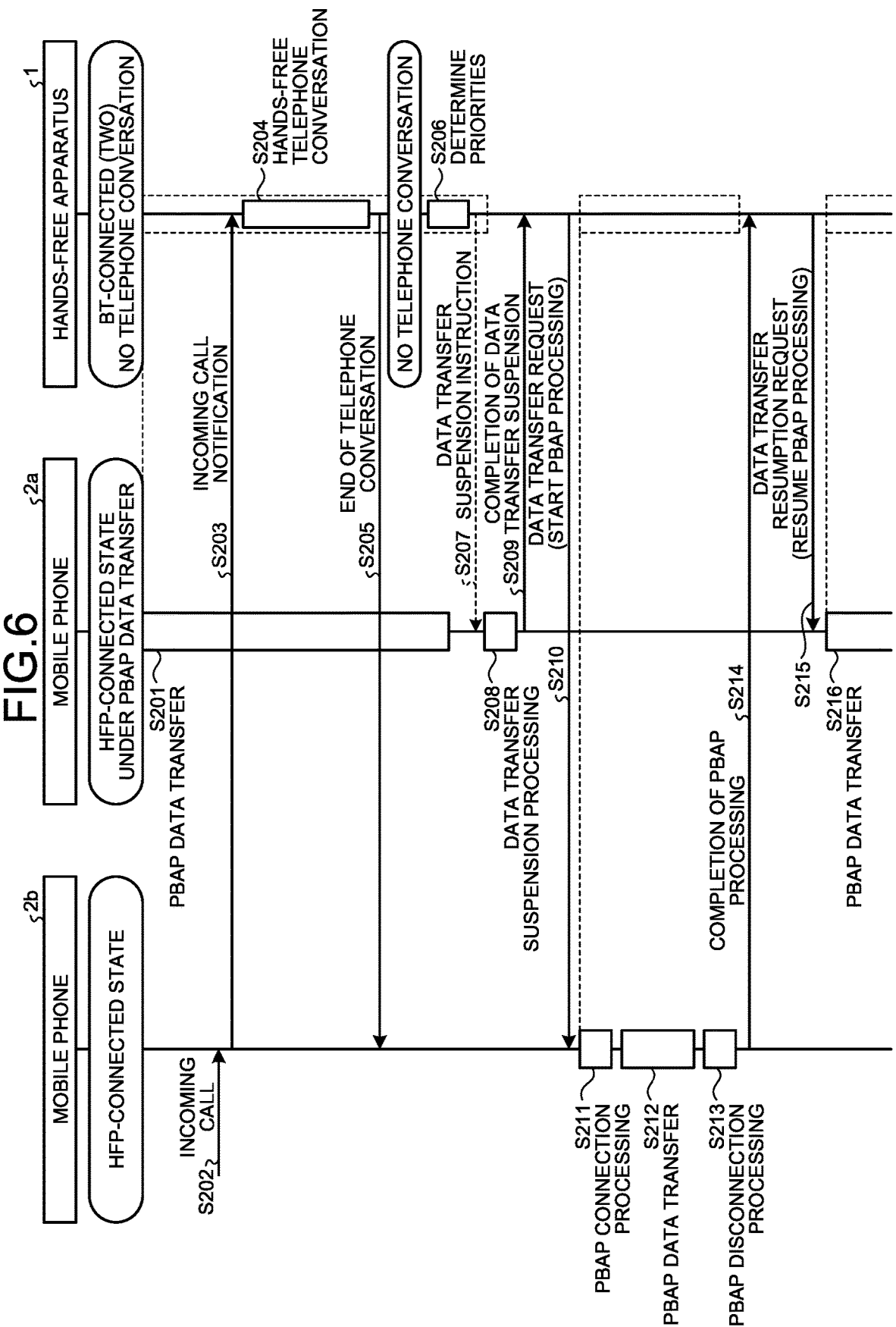
FIG. 6 is a sequence diagram of an exemplary procedure of processing to be executed by the hands-free apparatus and the mobile phones according to a second embodiment.

FIG. 6 is a sequence diagram of an exemplary procedure of processing to be executed by the hands-free apparatus 1 and the mobile phones 2a and 2b according to the present embodiment.

The PABP-based data transfer processing at S201 to the end of the hands-free telephone conversation at S205 are similar to the processing at S101 to S105 of the first embodiment described in FIG. 5.

The data transfer control unit 103 of the hands-free apparatus 1 of the present embodiment, after the end of the telephone conversation at S205, refers to the information on the priorities stored in the working memory 16 or the storage memory 17 and determines which of the priority of the mobile phone 2a and the priority of the mobile phone 2b is higher (S206).

In the example illustrated in this sequence diagram, it is assumed that the priority of the mobile phone 2b is higher than the priority of the mobile phone 2a. In this case, the data transfer control unit 103 transmits an instruction of data transfer suspension to the mobile phone 2a (S207).

The mobile phone 2a then executes processing to suspend the data transfer (S208). The mobile phone 2a transmits that the processing of data transfer suspension has been completed to the hands-free apparatus 1 (S209).

Next, the data transfer control unit 103 of the hands-free apparatus 1, upon completion of the suspension of the data transfer processing with the mobile phone 2a, transmits a data transfer request to the mobile phone 2b to start PBAP-based data transfer processing (S210).

The mobile phone 2b, when receiving the data transfer request from the hands-free apparatus 1, executes PBAP connection processing to connect to the hands-free apparatus 1 by PBAP (S211).

The mobile phone 2b executes PBAP data transfer processing to transfer the history data or the phonebook data to the hands-free apparatus 1 (S212). In this case, the data transfer control unit 103 of the hands-free apparatus 1 receives the history data or the phonebook data from the mobile phone 2a.

The mobile phone 2b, when transferring all the data to be transferred, disconnects the PBAP connection with the hands-free apparatus 1 (S213). The mobile phone 2a notifies the hands-free apparatus 1 of completion of the PBAP-based data transfer processing (S214). In this case, the data transfer control unit 103 of the hands-free apparatus 1 disconnects the PABP connection with the mobile phone 2a.

The data transfer control unit 103 of the hands-free apparatus 1 transmits a data transfer resumption request to the mobile phone 2a to resume the PBAP-based data transfer processing (S215).

The mobile phone 2a, when receiving the data transfer resumption request from the hands-free apparatus 1, resumes the PBAP-based data transfer to the hands-free apparatus 1 (S216). FIG. 6 omits a description of the processing after the resumption of the data transfer.

Thus, the hands-free apparatus 1 of the present embodiment executes the data transfer to the one mobile phone 2a and the second mobile phone 2b at the prescribed timing in the data transfer in accordance with the priorities of the one mobile phone 2a and the second mobile phone 2b. Thus, the hands-free apparatus 1 of the present embodiment can quickly transfer the history or the phonebook data stored in the mobile phone 2 with high priority to the hands-free apparatus 1 in addition to including the effect of the first embodiment. Among the mobile phones 2, the priority of the mobile phone 2 for business use is set to be higher than the priority of the mobile phone 2 for private use, for example, whereby the user can quickly refer to a history such as an incoming call related to business with the hands-free apparatus 1.

The hands-free apparatus 1 of the present embodiment, when receiving a notification that an outgoing call or an incoming call has been made or received from the second mobile phone 2b while receiving the history data or the phonebook data from the one mobile phone 2a, and when the priority of the one mobile phone 2a is lower than the priority of the second mobile phone 2b, suspends the reception of the history data or the phonebook data from the one mobile phone 2a and starts the reception of the history data or the phonebook data from the second mobile phone 2b. The hands-free apparatus 1 of the present embodiment resumes the reception of the history data or the phonebook data from the one mobile phone 2a after the end of the reception of the history data or the phonebook data from the second mobile phone 2b. Thus, the hands-free apparatus 1 of the present embodiment can inhibit the history data or the phonebook data suspended to be transferred from being unable to be acquired.

The hands-free apparatus 1 of the present embodiment, when receiving a notification that an outgoing call or an incoming call has been made or received from the second mobile phone 2b while receiving the history data or the phonebook data from the one mobile phone 2a, and when the priority of the one mobile phone 2a is higher than the priority of the second mobile phone 2b, receives the history data or the phonebook data from the second mobile phone 2b after the reception of the history data or the phonebook data from the one mobile phone 2a has ended. Thus, the hands-free apparatus 1 of the present embodiment can inhibit the data transfer from the mobile phone 2 with high priority from being suspended by a notification or the like from the second mobile phone 2.

In the present embodiment, the data transfer control unit 103 determines the presence or absence of the suspension of the data transfer in accordance with the priorities stored in the working memory 16 or the storage memory 17 in advance; the user may be able to select the priorities as needed. The display control unit 105 may display a screen enabling the user to select which data transfer of the mobile phone 2a and the mobile phone 2b is given priority on the display unit 15 after the end of the hands-free telephone conversation, for example.

Third Embodiment

In this third embodiment, the hands-free apparatus 1, when the second mobile phone 2b has entered the Bluetooth communication range of the hands-free apparatus 1 while the hands-free apparatus is receiving the history data or the phonebook data from the one mobile phone 2a, executes the initial data transfer from the second mobile phone 2b after the end of the data transfer of the one mobile phone 2a.

A hardware configuration and a functional configuration of the hands-free apparatus 1 of the present embodiment are similar to those of the first embodiment described in FIGS. 2 and 3.

The first and second embodiments described above describe, when the hands-free apparatus 1, while receiving the history data or the phonebook data from the mobile phone 2a, receives a notification indicating the change in the communication state from the second mobile phone 2b, the timing of execution of the data transfer with the notification as a trigger. The present embodiment describes a prescribed timing at which the initial data transfer is to be executed with the entry of the second mobile phone 2b into the Bluetooth communication range of the hands-free apparatus 1 as a trigger.

The hands-free telephone conversation connection unit 102 of the present embodiment, when the one mobile phone 2a or the second mobile phone 2b has entered a wireless connection communication range, connects to the one mobile phone 2a or the second mobile phone 2b to enable a hands-free telephone conversation by HFP.

More specifically, the hands-free telephone conversation connection unit 102 of the present embodiment, the data transfer control unit 103, when the second mobile phone 2b has entered the wireless connection communication range while the data transfer control unit 103 is receiving the history data or the phonebook data from the one mobile phone 2a, connects to the second mobile phone 2b to enable a hands-free telephone conversation by HFP while continuing the reception of the history data or the phonebook data from the one mobile phone 2a.

The data transfer control unit 103 of the present embodiment, when the second mobile phone 2b has entered the wireless connection communication range of the hands-free apparatus 1 and connected to enable a hands-free telephone conversation while the data transfer control unit 103 is receiving the history data or the phonebook data from the one mobile phone 2a, executes the reception of the history data or the phonebook data at the time of initial connection from the second mobile phone 2b, that is, the initial data transfer after the reception of the history data or the phonebook data from the one mobile phone 2a has ended. The timing of the initial data transfer from the second mobile phone 2b is an exemplary prescribed timing in the present embodiment.

The data transfer control unit 103 of the present embodiment, when receiving a notification that an outgoing call or an incoming call has been made or received from the one mobile phone 2a while receiving the history data or the phonebook data at the time of the initial connection from the second mobile phone 2b, receives the history data or the phonebook data from the one mobile phone 2a after the reception of the history data or the phonebook data at the time of the initial connection has ended.

Figure 7:
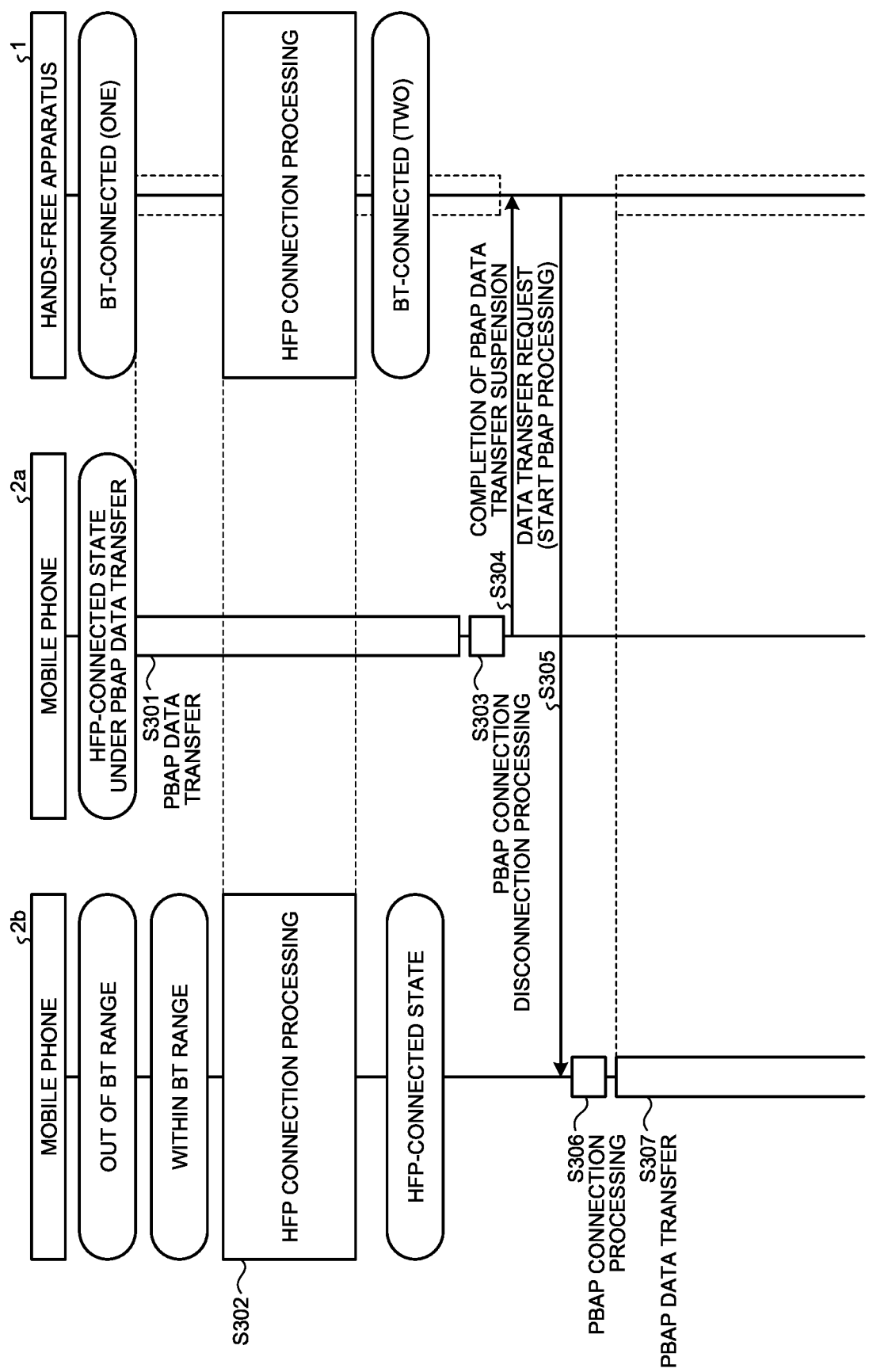
FIG. 7 is a sequence diagram of an exemplary procedure of processing to be executed by the hands-free apparatus and the mobile phones according to a third embodiment.

FIG. 7 is a sequence diagram of an exemplary procedure of processing to be executed by the hands-free apparatus 1 and the mobile phones 2a and 2b according to the present embodiment.

At the start of the processing of FIG. 7, the mobile phone 2a is positioned within the Bluetooth communication range of the hands-free apparatus 1. The mobile phone 2b is positioned outside the Bluetooth communication range of the hands-free apparatus 1. The hands-free apparatus 1 is being HFP-connected to the mobile phone 2a.

The PABP-based data transfer processing at S301 is similar to the processing at S101 of the first embodiment described in FIG. 5.

Next, the mobile phone 2b enters the Bluetooth communication range of the hands-free apparatus 1 from the outside of the Bluetooth communication range of the hands-free apparatus 1. When the user carrying the mobile phone 2b enters the vehicle 3 from the outside, for example, the mobile phone 2b enters the Bluetooth communication range.

The mobile phone 2b, when entering the Bluetooth communication range of the hands-free apparatus 1, may be in a telephone conversation state or a non-telephone conversation state.

The data transfer control unit 103 of the hands-free apparatus 1 executes HFP connection processing with the mobile phone 2b (S302). The processing corresponds to the processing described at S1 of FIG. 4. After completion of the HFP connection processing, the mobile phone 2b becomes HFP-connected to the hands-free apparatus 1. In this case, the hands-free apparatus 1 becomes also Bluetooth-connected to the mobile phone 2b in addition to the mobile phone 2a.

In FIG. 4, immediately after the HFP-connected state has been reached, the processing to transfer the history data or the phonebook data is started; in this FIG. 7, when the mobile phone 2b has become HFP-connected, the mobile phone 2a is under data transfer. In this case, the data transfer control unit 103 waits for completion of the transfer of the history data or the phonebook data from the mobile phone 2a.

Also during the execution of the processing at S302, the PABP-based data transfer processing at S301 is continuously executed. The PBAP connection disconnection processing at S302 to the notification of completion of the PBAP-based data transfer processing at S304 are similar to the processing at S106 to S107 of FIG. 5.

Next, the data transfer control unit 103 of the hands-free apparatus 1 transmits a data transfer request to the mobile phone 2b that has entered the Bluetooth communication range to be HFP-connected to start PBAP-based data transfer processing (S305).

The mobile phone 2b, when receiving the data transfer request from the hands-free apparatus 1, executes PBAP connection processing connecting to the hands-free apparatus 1 by PBAP (S306).

The mobile phone 2b executes PBAP data transfer processing to transfer the history data or the phonebook data to the hands-free apparatus 1 (S307). The data transfer at S307 is initial data transfer and corresponds to the processing described at S3 and S4 of FIG. 4. FIG. 7 omits a description of the subsequent processing.

Thus, the hands-free apparatus 1 of the present embodiment, when the second mobile phone 2b has entered the wireless connection communication range and connected to enable a hands-free telephone conversation while the hands-free apparatus 1 is receiving the history data or the phonebook data from the one mobile phone 2a, executes reception of the history data or the phonebook data from the second mobile phone 2b after the reception of the history data or the phonebook data from the one mobile phone 2a has ended. Thus, the hands-free apparatus 1 of the present embodiment can continue the data transfer processing already being executed even when the mobile phone 2 has newly entered the communication range in addition to including the effect of the first embodiment.

The hands-free apparatus 1 of the present embodiment, when the second mobile phone 2b has entered the wireless connection communication range while the hands-free apparatus 1 is receiving the history data or the phonebook data from the one mobile phone 2a, connects to the second mobile phone 2b to enable a hands-free telephone conversation while continuing the reception of the history data or the phonebook data from the one mobile phone 2a. Thus, the hands-free apparatus 1 of the present embodiment, even while receiving the history data or the phonebook data from the one mobile phone 2a, concurrently connects to the mobile phone 2 that has newly entered the communication range, to enable hands-free telephone conversation and can thus, even when the mobile phone 2 that has newly entered the communication range has immediately received an incoming call, make a hands-free telephone conversation.

Fourth Embodiment

In this fourth embodiment, the hands-free apparatus 1, when the second mobile phone 2b has entered the Bluetooth communication range of the hands-free apparatus 1 while the hands-free apparatus 1 is receiving the history data or the phonebook data from the one mobile phone 2a, varies in the timing of the initial data transfer from the second mobile phone 2b in accordance with the priorities of the one mobile phone 2a and the second mobile phone 2b.

A hardware configuration and a functional configuration of the hands-free apparatus 1 of the present embodiment are similar to those of the first embodiment described in FIGS. 2 and 3.

The reception unit 101 of the present embodiment, like the second embodiment, receives registration of the priorities of the data transfer of the mobile phones 2 from the user. The reception unit 101 stores the received priorities in the working memory 16 or the storage memory 17.

The hands-free telephone conversation connection unit 102 of the present embodiment, like the third embodiment, when the one mobile phone 2a or the second mobile phone 2b has entered the wireless connection communication range, connects to the one mobile phone 2a or the second mobile phone 2b to enable a hands-free telephone conversation by HFP.

The data transfer control unit 103 of the present embodiment, when the second mobile phone 2b has entered the wireless connection range and connected to enable a hands-free telephone conversation while the data transfer control unit 103 is receiving the history data or the phonebook data from the one mobile phone 2a, varies in the timing of the initial data transfer from the second mobile phone 2b in accordance with the priorities. The timing of the initial data transfer from the second mobile phone 2b is an exemplary prescribed timing in the present embodiment.

More specifically, the data transfer control unit 103, when the priority of the one mobile phone 2a is lower than the priority of the second mobile phone 2b, suspends the reception of the history data or the phonebook data from the one mobile phone 2a and starts reception of the history data or the phonebook data from the second mobile phone 2b. The data transfer control unit 103 resumes the reception of the history data or the phonebook data from the one mobile phone 2a after the end of the reception of the history data or the phonebook data from the one mobile phone 2b.

The data transfer control unit 103, when the priority of the one mobile phone 2a is higher than the priority of the second mobile phone 2b, receives the history data or the phonebook data from the second mobile phone 2b after the reception of the history data or the phonebook data from the one mobile phone 2a has ended.

Figure 8:
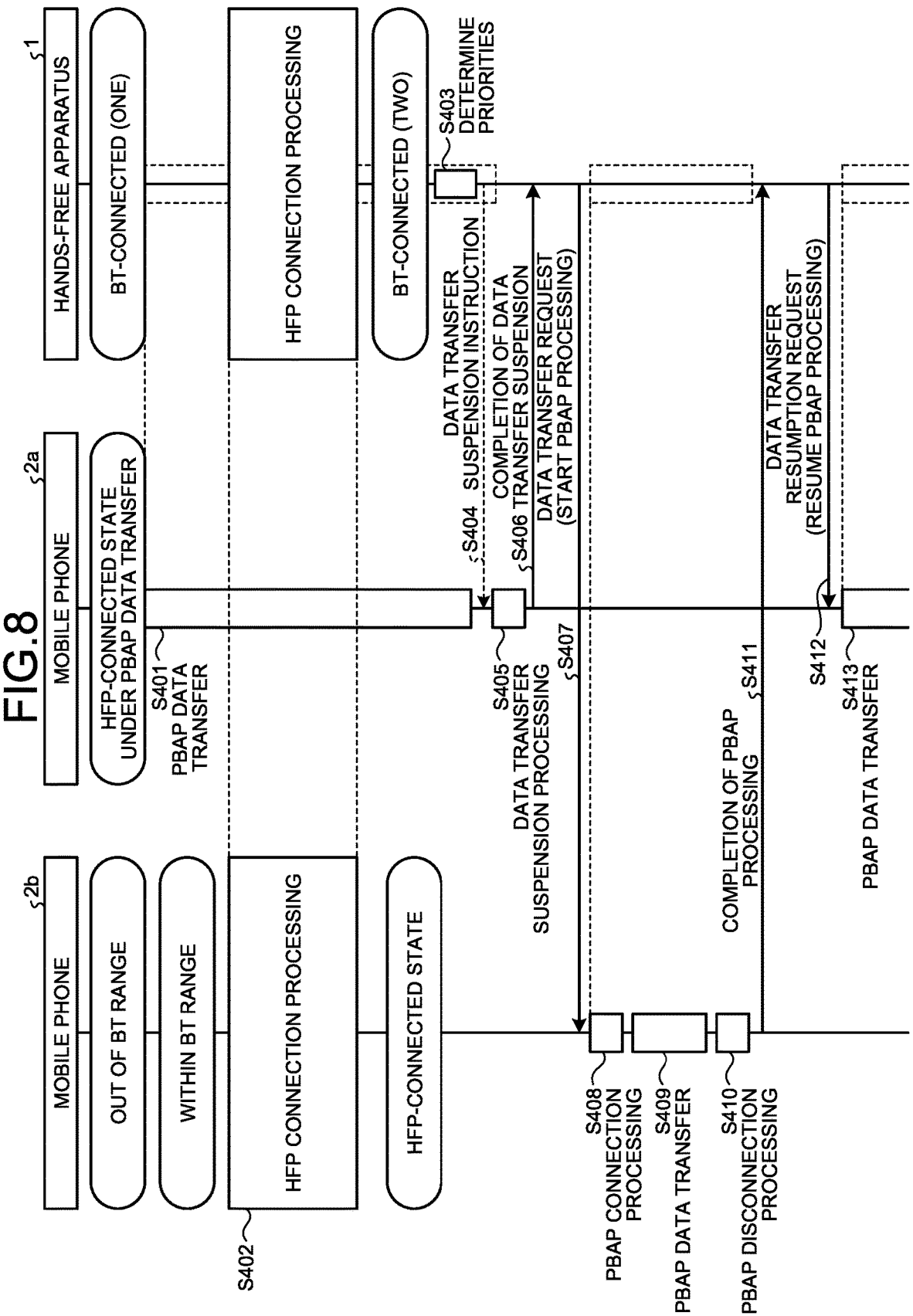
FIG. 8 is a sequence diagram of an exemplary procedure of processing to be executed by the hands-free apparatus and the mobile phones according to a fourth embodiment.

FIG. 8 is a sequence diagram of an exemplary procedure of processing to be executed by the hands-free apparatus 1 and the mobile phones 2a and 2b according to the present embodiment.

The PABP-based data transfer processing at S401 to the HFP connection processing between the mobile phone 2b and the hands-free apparatus 1 at S402 are similar to the processing at S301 to S302 of the third embodiment described in FIG. 7.

The data transfer control unit 103 of the hands-free apparatus 1, after HFP connection has been established between the mobile phone 2b and the hands-free apparatus 1, refers to the information on the priorities stored in the working memory 16 or the storage memory 17 and determines which of the priority of the mobile phone 2a and the priority of the mobile phone 2b is higher (S403).

In the example illustrated in this sequence diagram, it is assumed that the priority of the mobile phone 2b is higher than the priority of the mobile phone 2a. In this case, the data transfer control unit 103 transmits an instruction of suspension of the data transfer to the mobile phone 2a (S404).

The processing of the suspension of the data transfer at S405 to the processing of the transmission of the completion of the data transfer suspension processing at S406 are similar to the processing at S208 to S209 of the second embodiment described in FIG. 6.

The data transfer control unit 103 of the hands-free apparatus 1, upon completion of the suspension of the data transfer processing with the mobile phone 2a, transmits a data transfer request to the mobile phone 2b to start PBAP-based data transfer processing (S407).

The PBAP connection processing at S408 to the PBAP data transfer processing at S409 are similar to the processing at S306 to S307 of the third embodiment described in FIG. 7.

Upon completing the initial data transfer from the mobile phone 2b to the hands-free apparatus 1, the mobile phone 2b disconnects the PBAP connection with the hands-free apparatus 1 (S410). The mobile phone 2a notifies the hands-free apparatus 1 of the completion of the PBAP-based data transfer processing (S411). In this case, the data transfer control unit 103 of the hands-free apparatus 1 disconnects the PABP connection with the mobile phone 2a.

The data transfer resumption request at S412 to the processing of resumption of the PBAP data transfer of the mobile phone 2a at S413 are similar to S215 to S216 of the second embodiment described in FIG. 6.

Thus, the hands-free apparatus 1 of the present embodiment, when the second mobile phone 2b has entered the wireless connection range and connected to enable a hands-free telephone conversation while the hands-free apparatus 1 is receiving the history data or the phonebook data from the one mobile phone 2a, varies in the prescribed timing in accordance with the priorities. Thus, the hands-free apparatus 1 of the present embodiment, when the mobile phone 2 with high priority has entered the wireless connection range, can quickly execute the initial data transfer for the mobile phone 2 in addition to including the effect of the first embodiment The hands-free apparatus 1 of the present embodiment, when the priority of the one mobile phone 2a is lower than the priority of the second mobile phone 2b, suspends the reception of the history data or the phonebook data from the one mobile phone 2a and starts the reception of the history data or the phonebook data from the second mobile phone 2b. The hands-free apparatus 1 of the present embodiment resumes the reception of the history data or the phonebook data from the one mobile phone 2a after the end of the reception of the history data or the phonebook data from the second mobile phone 2b. Thus, the hands-free apparatus 1 of the present embodiment can inhibit the history data or the phonebook data suspended to be transferred from being unable to be acquired.

In the present embodiment, the data transfer control unit 103 determines the presence or absence of the suspension of the data transfer in accordance with the priorities stored in the working memory 16 or the storage memory 17 in advance; the user may be able to select the priorities as occasion demands. The display control unit 105 may display a screen enabling the user to select which data transfer of the mobile phone 2a and the mobile phone 2b is given priority on the display unit 15 after the end of the hands-free telephone conversation, for example.

Fifth Embodiment

In the first to fourth embodiments described above, the hands-free apparatus 1 executes the PBAP-based data transfer for each one mobile phone 2. In contrast, in this fifth embodiment, the hands-free apparatus 1 executes the PBAP-based data transfer with the mobile phones 2 in parallel.

A hardware configuration and a functional configuration of the hands-free apparatus 1 of the present embodiment are similar to those of the first embodiment described in FIGS. 2 and 3.

The data transfer control unit 103 of the present embodiment, when receiving a notification that an outgoing call or an incoming call has been made or received from the second mobile phone 2b while receiving the history data or the phonebook data from the one mobile phone 2a, receives the history data or the phonebook data from the second mobile phone 2b concurrently with the reception of the history data or the phonebook data from the one mobile phone 2a.

In the present embodiment, the data transfer control unit 103 executes the data transfer for the mobile phones 2 in parallel regardless of being the initial data transfer or the data transfer triggered by the reception of the notification indicating the change in the communication state such as an incoming call or outgoing call received or made by the mobile phone 2.

The timing of the change in the communication state of the mobile phone 2 is an exemplary prescribed timing in the present embodiment. In the present embodiment, examples of the case when the communication state of the mobile phone 2 has changed include a case when the mobile phone 2 has made or received an outgoing call or an incoming call via the mobile phone network, a case when making an outgoing call or receiving an incoming call has returned to a standby state, and a case when the mobile phone 2 has entered the Bluetooth communication range of the hands-free apparatus 1 from the outside of the Bluetooth communication range of the hands-free apparatus 1.

The hands-free telephone conversation connection unit 102, the hands-free telephone conversation execution unit 104, or the data transfer control unit 103 may detect the change in the communication state of the mobile phone 2, or the mobile phone 2 may notify the hands-free apparatus 1 of the change in the communication state of the mobile phone 2. In this case, the timing of receiving the notification as a trigger of the data transfer is the prescribed timing in the present embodiment.

Figure 9:
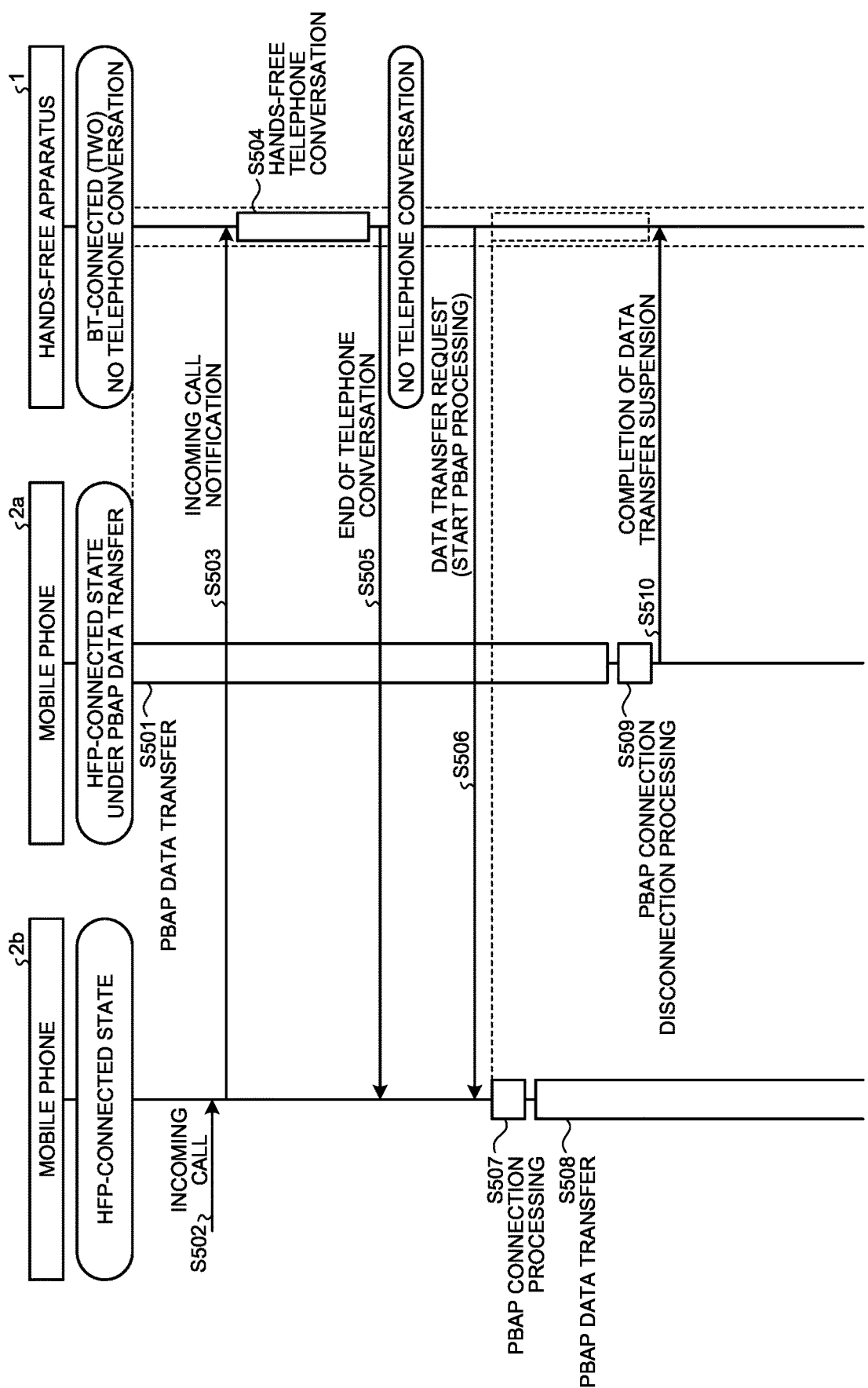
FIG. 9 is a sequence diagram of an exemplary procedure of processing to be executed by the hands-free apparatus and the mobile phones according to a fifth embodiment.

FIG. 9 is a sequence diagram of an exemplary procedure of processing to be executed by the hands-free apparatus 1 and the mobile phones 2a and 2b according to the present embodiment.

The PABP-based data transfer processing at S501 to the end of the hands-free telephone conversation at S505 are similar to the processing at S101 to S105 of the first embodiment described in FIG. 5.

The data transfer control unit 103 of the hands-free apparatus 1 of the present embodiment, after the end of the telephone conversation at S505, transmits a data transfer request to the mobile phone 2b to start PBAP-based data transfer processing while continuing the data transfer processing with the mobile phone 2a (S506).

The PBAP connection processing at S507 to the PBAP-based data transfer processing at S508 are similar to the processing at S109 to S110 of the first embodiment described in FIG. 5.

The mobile phone 2a, when transferring all the data to be transferred, disconnects the PBAP connection with the hands-free apparatus 1 (S509). The mobile phone 2a notifies the hands-free apparatus 1 of completion of the PBAP-based data transfer processing (S510). In this case, the data transfer control unit 103 of the hands-free apparatus 1 disconnects the PABP connection with the mobile phone 2a.

Thus, the hands-free apparatus 1 of the present embodiment, when receiving a notification that an outgoing call or an incoming call has been made or received from the second mobile phone 2b while receiving the history data or the phonebook data from the one mobile phone 2a, receives the history data or the phonebook data from the mobile phone 2b concurrently with the reception of the history data or the phonebook data from the one mobile phone 2a. Thus, the hands-free apparatus 1 of the present embodiment can quickly acquire the latest history data or phonebook data from each of the mobile phones 2 and can thus inhibit a state in which there is difference in the history data or the phonebook data between the hands-free apparatus 1 and each of the mobile phones 2 from continuing. Thus, the user of the hands-free apparatus 1 can refer to the latest history data or phonebook data from the hands-free apparatus 1, which improves convenience in an outgoing call operation, checking of incoming calls, and the like.

Sixth Embodiment

The first to fifth embodiments described above describe the data transfer timing when the hands-free apparatus 1 is connecting to the mobile phones 2. This sixth embodiment describes data transfer timing when the hands-free apparatus 1 is connecting to one mobile phone 2.

Figure 10:
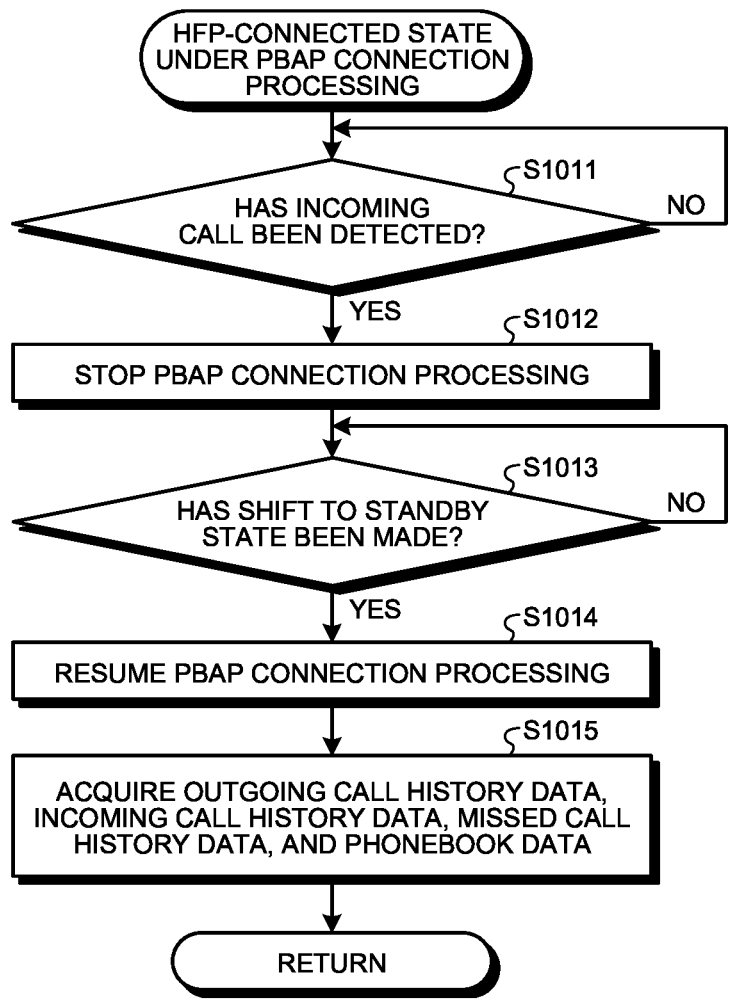
FIG. 10 is a flowchart of an exemplary procedure of processing when the mobile phone receives an incoming call during PBAP connection according to a sixth embodiment.

FIG. 10 is a flowchart of an exemplary procedure of processing when the mobile phone 2 receives an incoming call during PBAP connection according to the present embodiment. As an assumption of the processing of FIG. 10, the hands-free apparatus 1 is in an HFP-connected state and under PBAP connection processing with the mobile phone 2.

The processing executed by the control unit 12 in the flowcharts of FIG. 10 and FIG. 11 to FIG. 17 described below is processing implemented by the reception unit 101, the hands-free telephone conversation connection unit 102, the data transfer control unit 103, the hands-free telephone conversation execution unit 104, or the display control unit 105 described in FIG. 3, for example.

In FIG. 10, if the control unit 12 determines that the mobile phone 2 has detected an incoming call in the HFP-connected state and under the PBAP connection processing (Yes at S1011), the control unit 12 stops the PBAP connection processing (S1012) and determines whether the incoming call state or a telephone conversation state related to the incoming call has ended to shift to a standby state (S1013). Information for determining whether it is in the standby state is notified on HFP and is notified from the mobile phone 2 each time its own communication state (the standby state, an outgoing call is being made, an incoming call is being received, and being in a telephone conversation) changes. It may be received and obtained on demand from the hands-free apparatus 1.

If the control unit 12 determines that a shift to the standby state has been made owing to the incoming call having been rejected by the hands-free apparatus 1, the incoming call having been rejected by the mobile phone 2, the outgoing call counterpart having undone (canceled) the outgoing call or has ended the telephone conversation, or the telephone conversation having ended by an operation on the mobile phone 2 or the hands-free apparatus 1 (Yes at S1013), the control unit 12 resumes the PBAP connection processing from the beginning (S1014) and acquires the outgoing call history data, the incoming call history data, the missed call history data, and the phonebook data from the mobile phone 2 (S1015). Thus, even when the mobile phone 2 has received an incoming call under the PBAP connection processing, the incoming call state or the telephone conversation state related to the incoming call has ended to shift to the standby state, and then the PBAP connection processing is resumed from the beginning, whereby the outgoing call history data, the incoming call history data, the missed call history data, and the phonebook data can be appropriately received from the mobile phone 2 and maintain these various kinds of data to be the same as the various kinds of data of the mobile phone 2. In particular, the hands-free apparatus 1 can also obtain the data related to the incoming call at S1011 as the incoming call history data.

At S1014, when a shift from the incoming call state to the standby state has been made, the PBAP connection is started from the beginning; the reason for this is as follows. At the point in time when the incoming call state is detected, new incoming call history data occurs in the mobile phone 2. At the point in time when the incoming call state is detected, PBAP-based initial connection processing can be started, but if the incoming call still continues at the point in time when the initial connection processing is performed to start data transfer, it is unclear whether the incoming call is an missed call or a responded incoming call. Given these circumstances, if the data related to the incoming call is received in this state, the hands-free apparatus 1 cannot perform display in a distinguished manner whether it is the missed call or the responded incoming call in the display of the incoming call history. Given these circumstances, when a shift from the incoming call state to a different state has been made, that is, at a timing when the standby state has been reached from the incoming call state without through the telephone conversation state or when the telephone conversation state has been reached from the incoming call state, the PBAP-based initial connection processing and the data transfer are performed again from the beginning.

In the present embodiment, a shift to the standby state is finally made such as a case in which the standby state is reached from the incoming call state through the telephone conversation state or a case in which the standby state is reached from the incoming call state without through the telephone conversation state, and thus the standby state is detected to start the PBAP connection from the beginning. It is understood that the telephone conversation state may be detected from the incoming call state, which may be a trigger for the PBAP connection.

Figure 11:
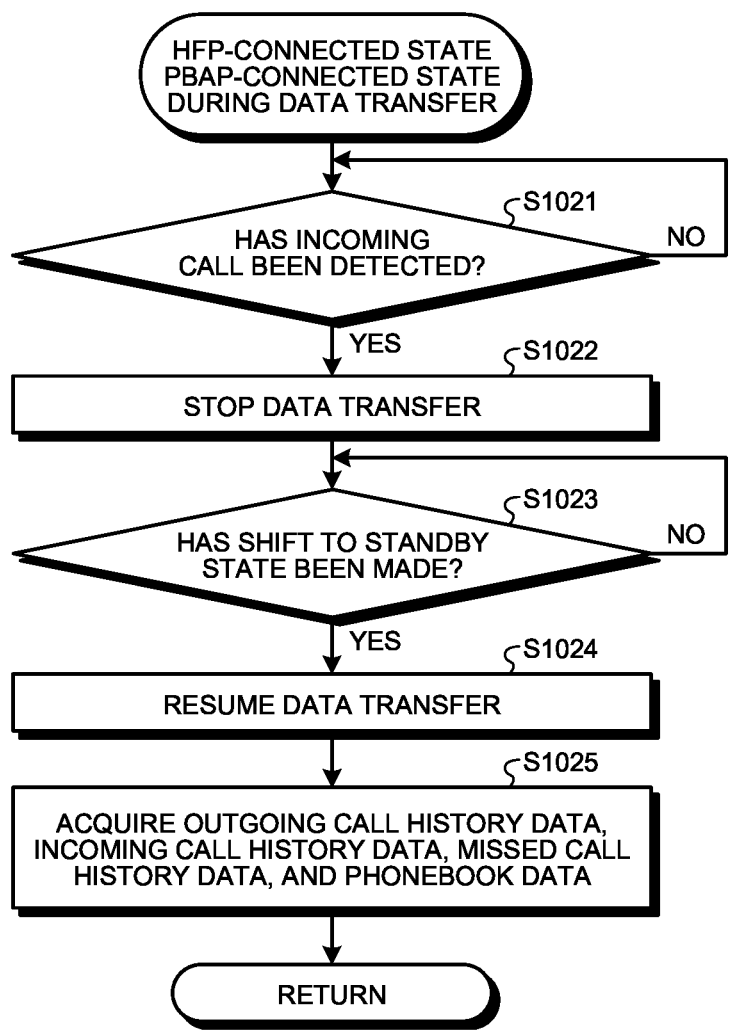
FIG. 11 is flowchart of an exemplary procedure of processing when an incoming call occurs while data is being transferred in an HFP-connected state and a PBAP-connected state according to the sixth embodiment.

FIG. 11 is a flowchart of an exemplary procedure of processing when an incoming call occurs while data (the outgoing call history data, the incoming call history data, the missed call history data, and the phonebook data) is transferred in an HFP-connected state and a PBAP-connected state according to the present embodiment.

FIG. 10 describes the processing when an incoming call occurs in the HFP-connected state and under the PBAP initial connection processing; FIG. 11 represents processing when an incoming call occurs while data (the outgoing call history data, the incoming call history data, the missed call history data, and the phonebook data) is transferred in the HFP-connected state and the PBAP-connected state. FIG. 11 corresponds to a case in FIG. 10 in which while determined to be "No" at S1011, the PBAPA connection processing is completed, the process shifts to the data transfer processing, and, when the process becomes under data transfer, the process is under data transfer at S1015.

In FIG. 11, if the control unit 12 determines that the mobile phone 2 has detected an incoming call while the data is transferred in the HFP-connected state and the PBAP-connected state (Yes at S1021), the control unit 12 stops the data transfer (S1022) and determines whether the incoming call state or a telephone conversation state related to the incoming call has ended to shift to the standby state (S1023). If the control unit 12 determines that a shift to the standby state has been made owing to the incoming call having been rejected by the hands-free apparatus 1, the incoming call having been rejected by the mobile phone 2, or the outgoing call counterpart having canceled the outgoing call or has ended the telephone conversation (Yes at S1023), the control unit 12 resumes the data transfer from the beginning (S1024) and acquires the outgoing call history data, the incoming call history data, the missed call history data, and the phonebook data from the mobile phone 2 (S1025). Thus, even when the mobile phone 2 has received an incoming call while the data is being acquired in the PBAP-connected state, the incoming call state or the telephone conversation state related to the incoming call has ended to shift to the standby state, and then the PBAP connection processing is resumed from the beginning, whereby the hands-free apparatus 1 can appropriately acquire the outgoing call history data, the incoming call history data, the missed call history data, and the phonebook data from the mobile phone 2 and maintain these various kinds of data to be the same as the various kinds of data of the mobile phone 2. In particular, the hands-free apparatus 1 can also obtain the data related to the incoming call at S1021 as the incoming call history data. At S1024, when a shift from the incoming call state to the standby state has been made, the PBAP connection is started from the beginning; the reason for this is the same reason as the description at S1014 described above.

The foregoing describes an example in which the mobile phone 2 has been carried into the vehicle, and the HFP connection, the PBAP connection, and the data transfer with the hands-free apparatus 1 are performed for the first time; the following describes simultaneous connection processing after PBAP-based data transfer has succeeded.

In the present embodiment, PBAP has ended data transfer, but its connection itself is maintained, providing an HFP-and-PBAP simultaneous connected state; in this state, on demand from the hands-free apparatus 1 or based on self-determination, PBAP-based data transfer can be started at a prescribed timing. Thus, as an on-vehicle hands-free system, even when a new incoming call or outgoing call occurs, the latest outgoing call history data, incoming call history data, and unattended call history data of the mobile phone 2 can be updated. The following describes this point with reference to FIG. 12 to FIG. 17.

As an assumption, after the HFP connection, when an incoming call occurs in the mobile phone 2, for the mobile phone 2, the incoming call history data and the outgoing call history data including the incoming call and the outgoing call are after all its own history data and are thus held in the memory of the mobile phone 2 itself. After the HFP connection, when outgoing call processing is performed by the mobile phone 2 via the Bluetooth communication unit 13 by the operating unit 14, the telephone number of the outgoing call destination is sent to the mobile phone 2 via the Bluetooth communication unit 13, and thus the outgoing call history data including the outgoing call is after all the history data of its own and is thus held in the memory of the mobile phone 2 itself.

Figure 12:
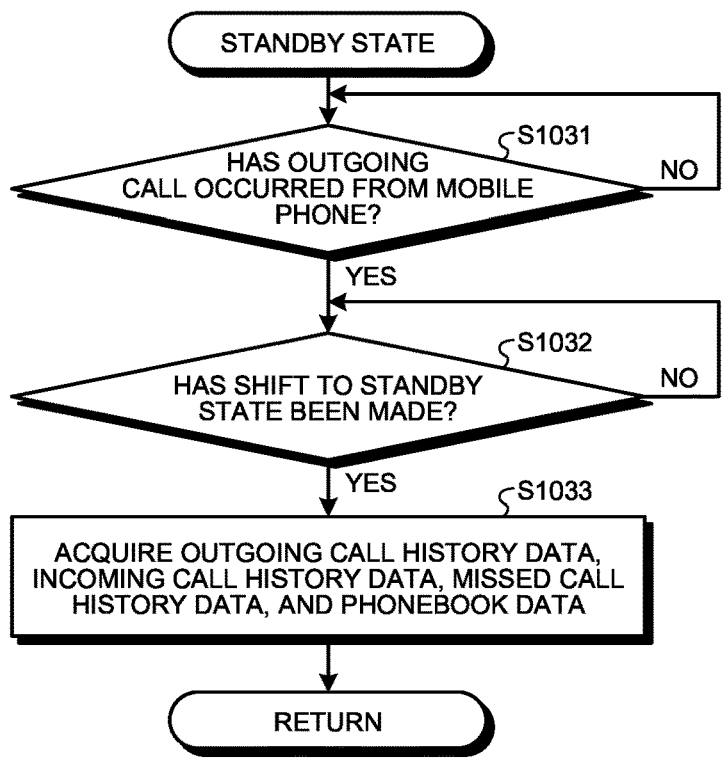
FIG. 12 is a flowchart of an exemplary procedure of data transfer processing according to the sixth embodiment.

FIG. 12 is a flowchart of an exemplary procedure of data transfer processing according to the present embodiment. As described above, with the hands-free apparatus 1 and the mobile phone 2 connected to each other on HFP, the outgoing call processing can be performed by an operation on the operation unit 14 of the hands-free apparatus 1. In addition to this, in the HFP-connected state, a hands-free telephone conversation may be able to be performed by performing outgoing call processing by an operation on the mobile phone 2.

In this case, the hands-free apparatus 1 is required to acquire the outgoing call history data by this outgoing call processing and to perform processing to update it to the latest state. The hands-free apparatus 1 can determine whether it is its own outgoing call and is notified of the communication state of the mobile phone 2 by the HFP connection and can thus determine whether it is an outgoing call by its own operating unit 14 or outgoing call processing by an operation on the mobile phone 2.

In FIG. 12, if the control unit 12 determines that an outgoing call has occurred from the mobile phone 2 in the standby state (Yes at S1031), the control unit 12 determines whether the outgoing call state has ended to shift to the standby state (S1032). As a situation where this S1032 occurs, the control unit 12 determines that a shift to the standby state has been made without shifting to the telephone conversation state owing to the hands-free apparatus 1 having canceled the outgoing call from the mobile phone 2, the mobile phone 2 having canceled the outgoing call from itself, or the outgoing call counterpart having rejected the incoming call, for example (Yes at S1032). Then, the outgoing call history data, the incoming call history data, the missed call history data, and the phonebook data are acquired from the mobile phone 2 (S1033). Thus, each time an outgoing call from the mobile phone 2 ends, the outgoing call history data, the incoming call history data, the missed call history data, and the phonebook data can be acquired from the mobile phone 2 and these various kinds of data can be made to be the same as the various kinds of data of the mobile phone 2. In this example, it is determined that a shift to the standby state has been made at S1032; when it is detected that the outgoing call state has been reached, the process may advance to S1033.

Figure 13:
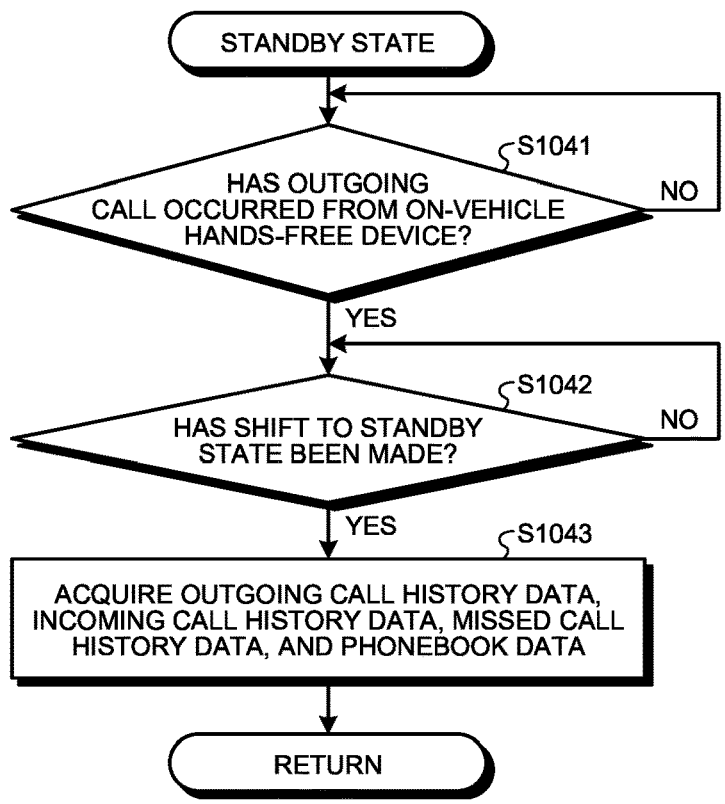
FIG. 13 is a flowchart of an exemplary procedure of data transfer processing when outgoing call processing is started by an operating unit of the hands-free apparatus according to the sixth embodiment.

The following describes FIG. 13. FIG. 13 is a flowchart of an exemplary procedure of data transfer processing when outgoing call processing is started by the operating unit 14 of the hands-free apparatus 1 according to the present embodiment.

In FIG. 12, the outgoing call operation by the mobile phone 2 is detected, and the data transfer processing is performed at S1033; FIG. 13 illustrates a case in which outgoing call processing is started by the operating unit 14 of the hands-free apparatus 1.

In FIG. 13, if the control unit 12 determines that an outgoing call has occurred from the hands-free apparatus 1 in the standby state (Yes at S1041), the control unit 12 determines whether the outgoing call state has ended to shift to the standby state (S1042). Examples of a situation causing this S1042 include the fact that the hands-free apparatus 1 has canceled the outgoing call from the apparatus, that the mobile phone 2 has canceled the outgoing call from the hands-free apparatus 1, or that the outgoing call counterpart has reject the incoming call. If the control unit 12 determines that a shift to the standby state has been made without shifting to the telephone conversation state at S1042, the outgoing call history data, the incoming call history data, the missed call history data, and the phonebook data are acquired from the mobile phone 2 (S1043). Thus, each time an outgoing call from the hands-free apparatus 1 ends, the outgoing call history data, the incoming call history data, the missed call history data, and the phonebook data can be acquired from the mobile phone 2 and these various kinds of data can be made to be the same as the various kinds of data of the mobile phone 2. In this example, it is determined that a shift to the standby state has been made at S1042; but the process may advance to S1043 when it is detected that the outgoing call state has been reached.

Figure 14:
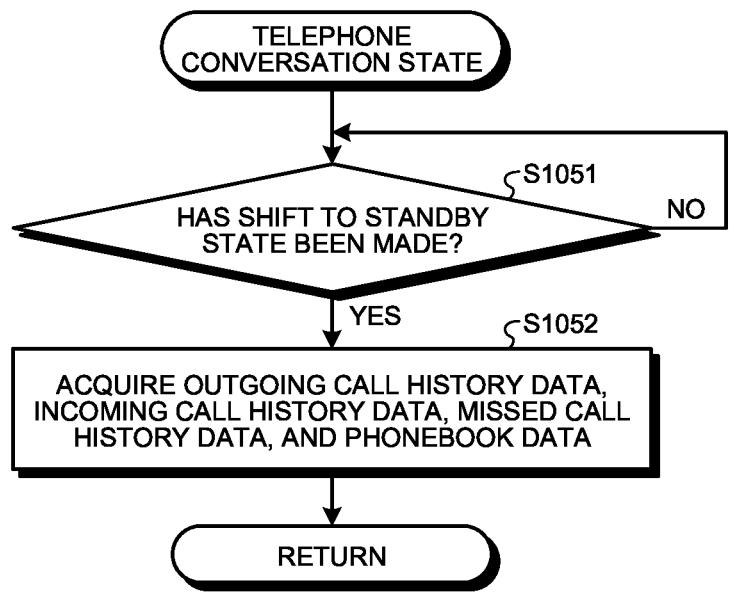
FIG. 14 is a flowchart of an exemplary procedure of processing to perform data transfer when a shift from a telephone conversation state to a standby state has been made according to the sixth embodiment.

The following describes FIG. 14. FIG. 14 is a flowchart of an exemplary procedure of processing to perform data transfer when a shift from the telephone conversation state to the standby state has been made according to the present embodiment. FIG. 14 is a modification of FIG. 12 and FIG. 13, which is not an example in which the standby state has been reached from the outgoing call state without reaching the telephone conversation state, in which the data transfer is performed when a shift from the telephone conversation state to the standby state has been made.

In FIG. 14, if the control unit 12 determines, in a hands-free telephone conversation state by the hands-free apparatus 1 and the mobile phone 2 or a telephone conversation state by the mobile phone 2 alone, that a shift to the standby state has been made owing to the hands-free apparatus 1 having ended the telephone conversation, the mobile phone 2 having ended the telephone conversation, or the communication counterpart having ended the telephone conversation (Yes at S1051), the control unit 12 acquires the outgoing call history data, the incoming call history data, the missed call history data, and the phonebook data from the mobile phone 2 (S1052). Thus, each time a telephone conversation ends, the outgoing call history data, the incoming call history data, the missed call history data, and the phonebook data can be acquired from the mobile phone 2 and these various kinds of data can be made to be the same as the various kinds of data of the mobile phone 2.

Figure 15:
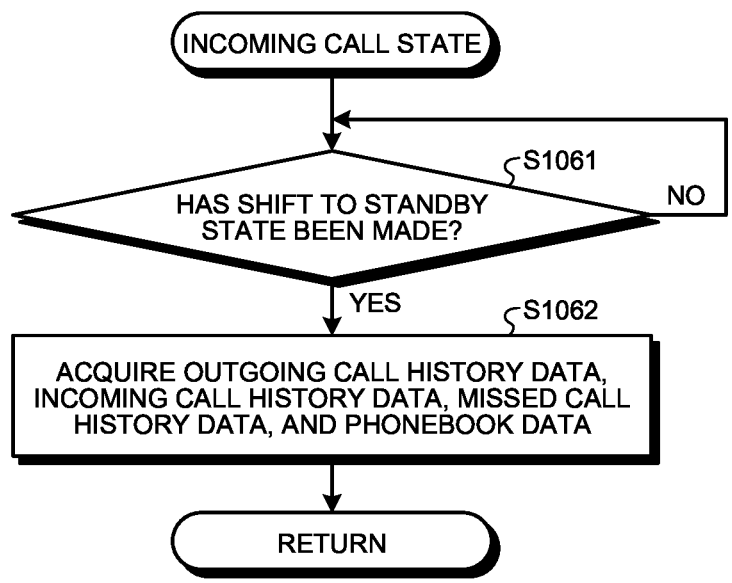
FIG. 15 is a flowchart of an exemplary procedure of processing at the time of an incoming call according to the sixth embodiment.

FIG. 15 is a flowchart of an exemplary procedure of processing at the time of an incoming call according to the present embodiment. In FIG. 15, if the control unit 12 determines, in an incoming call state, that a shift to the standby state has been made owing to the incoming call having been rejected by the hands-free apparatus 1 at the time of the incoming call state, the incoming call having been rejected by the mobile phone 2, the outgoing call counterpart having canceled the outgoing call, or a telephone conversation state having been reached after the incoming call has been received, and then the telephone conversation having ended (Yes at S1061), the control unit 12 acquires the outgoing call history data, the incoming call history data, the missed call history data, and the phonebook data from the mobile phone 2 (S1062). Thus, each time an incoming call ends, the outgoing call history data, the incoming call history data, the missed call history data, and the phonebook data can be acquired from the mobile phone 2 and these various kinds of data can be made to be the same as the various kinds of data of the mobile phone 2.

The data transfer can be performed immediately after the incoming call state has been reached from the standby state; in the incoming call state alone it is unclear whether it is an missed call, in which the incoming call was not responded to, or a responded incoming call, in which the telephone conversation state has been reached from the incoming call state. Given these circumstances, in the present embodiment, even in the case of the missed call, in which the standby state has been reached from the incoming call state, when the incoming call state ends, the standby state is reached; even in the case of the responded incoming call, the telephone conversation eventually ends and the standby state is reached; and thus by determining that the standby state has been reached from the incoming call state is determined, and using this as a trigger, data about whether it is the missed call or the responded incoming call can be transferred from the mobile phone 2, and a display screen that enables recognition about whether the incoming call is the missed call or the responded incoming call can be generated.

Figure 16:
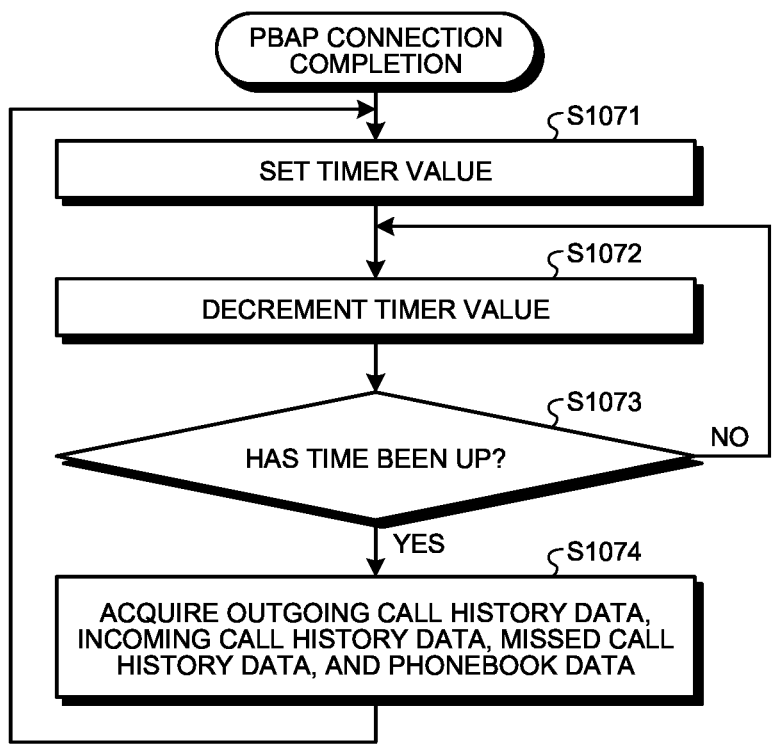
FIG. 16 is a flowchart of another exemplary start timing of data transfer according to the sixth embodiment.

FIG. 16 is a flowchart of another exemplary start timing of data transfer according to the present embodiment. FIG. 16 starts the data transfer using a timer without the communication state such as the outgoing call, the incoming call, or the telephone conversation set as a prescribed timing. In FIG. 16, upon completing the PBAP connection, the control unit 12 sets a timer value (S1071), decrements the timer value at prescribed time intervals (S1072), and, upon determining that time is up according to the timer value (S1073), acquires the outgoing call history data, the incoming call history data, the missed call history data, and the phonebook data from the mobile phone 2 (S1074). Thus, the outgoing call history data, the incoming call history data, the missed call history data, and the phonebook data can be regularly acquired from the mobile phone 2 and these various kinds of data can be made to be the same as the various kinds of data of the mobile phone 2.

FIG. 17 is a flowchart of another exemplary start timing of data transfer according to the present embodiment. FIG. 17 starts the data transfer with an operation on the operating unit 14 by the user as a trigger without the communication state such as the outgoing call, the incoming call, or the telephone conversation and the timer set as a prescribed timing. In FIG. 17, if the control unit 12 determines that the user has performed an operation to change a display screen so that transition to any of a display screen of the outgoing call history data, a display screen of the incoming call history data, a display screen of the missed call history data, and a display screen of the phonebook data has been made (Yes at S1081), the control unit 12 acquires the outgoing call history data, the incoming call history data, the missed call history data, and the phonebook data from the mobile phone 2 (S1082). Thus, each time transition to any of the display screen of the outgoing call history data, the display screen of the incoming call history data, the display screen of the missed call history data, and the display screen of the phonebook data is made, the outgoing call history data, the incoming call history data, the missed call history data, and the phonebook data can be acquired from the mobile phone 2 and these various kinds of data can be made to be the same as the various kinds of data of the mobile phone 2.

In the processing of FIG. 12 to FIG. 17, the hands-free apparatus 1 receives the outgoing call history data, the incoming call history data, the missed call history data, and the phonebook data at the prescribed timing. However, the phonebook data takes time for processing to convert it into Vcard form, has a larger data amount than that of the outgoing call history data, the incoming call history data, and the missed call history data, thus has a large load on the mobile phone 2, and causes its battery capacity to reduce.

Given these circumstances, when the mobile phone 2 is wirelessly connected to the hands-free apparatus 1 and the PBAP-based data transfer is performed, only the outgoing call history data, the incoming call history data, and the missed call history data may be data-transferred at the prescribed timing. Thus, the processing of the mobile phone 2 can be reduced, and the reduction in its battery capacity can be inhibited.

The hands-free apparatus 1 receives the outgoing call history data, the incoming call history data, the missed call history data, and the phonebook data at the prescribed timing. However, the hands-free apparatus 1 can grasp whether it is in the incoming call state or the outgoing call state as described above, and thus when an incoming call occurs, only the incoming call history data and the missed call history data may be transferred, whereas when an outgoing call occurs, only the outgoing call history data may be transferred. Consequently, useless data transfer can be omitted, the processing of the mobile phone 2 can be reduced, and the reduction in its battery capacity can be inhibited.

The processing described with reference to FIG. 12 to FIG. 17 may be performed singly or performed with a plurality of pieces of them combined with each other. FIG. 12 to FIG. 16 in particular may all be executed.

The data transfer timing between the individual mobile phone 2 and the hands-free apparatus 1 described in the present embodiment may be combined with the case of being connected to the mobile phones 2 described in the first to fifth embodiments described above.

A computer program executed by the hands-free apparatus 1 of the embodiments described above is embedded and provided in a ROM, for example. The computer program executed by the hands-free apparatus 1 of the embodiments described above may be recorded and provided on a computer-readable recording medium such as a compact disc read only memory (CD-ROM), a flexible disk (FD), a compact disc recordable (CD-R), or a digital versatile disc (DVD) as an installable or executable file.

The computer program executed by the hands-free apparatus 1 of the embodiments described above may be stored in a computer connected to a network such as the Internet and provided by being downloaded via the network. The computer program executed by the hands-free apparatus 1 of the embodiments described above may be provided or distributed via a network such as the Internet.

First Modification

In the embodiments described above, the hands-free apparatus 1 is installed in the vehicle 3; the hands-free apparatus 1 is not limited to an on-vehicle apparatus. The hands-free apparatus 1 may be able to be used when the user holds a telephone conversation in a hands-free manner outside the vehicle 3, for example.

Second Modification

In the embodiments described above, the hands-free apparatus 1 is implemented as one function of the on-vehicle navigation apparatus installed in the vehicle 3; the configuration is not limited thereto. The hands-free apparatus 1 may be formed by an exclusive hands-free apparatus mainly implementing a hands-free function or may be an apparatus installing a hands-free function in an on-vehicle audio apparatus reproducing compact discs (CDs) or radio. The hands-free apparatus 1 may have portability (be of a portable type).

Third Modification

In the embodiments described above, the reception unit 101, the hands-free telephone conversation connection unit 102, the data transfer control unit 103, the hands-free telephone conversation execution unit 104, and the display control unit 105 are implemented by reading the computer program from the storage memory 17 and executing it by the control unit 12; these functions may be implemented by a hardware circuit.

Other Modifications

The hands-free apparatus 1 may store the outgoing call history data, the incoming call history data, and the phonebook data received from the mobile phone 2 in the storage memory 17 and, each time the outgoing call history data, the incoming call history data, the phonebook data are received from the mobile phone 2 from the mobile phone 2, store the outgoing call history data, the incoming call history data, and the phonebook data received from the mobile phone 2 in an updated manner. The outgoing call history data, the incoming call history data, and the phonebook data received from the mobile phone 2 received from the mobile phone 2 may be stored in both the working memory 16 and the storage memory 17 with the storage memory 17 used as a backup memory.

In the embodiments described above, when the mobile phone 2 and the hands-free apparatus 1 establish the Bluetooth communication line, the various kinds of data are automatically transferred; the transfer processing may be executed manually by the user. The outgoing call history data, the incoming call history data, and the phonebook data may be transferred on the condition that the user operates the hands-free apparatus 1 or the mobile phone 2, for example.

When the outgoing call history data, the incoming call history data, and the phonebook data received from the mobile phone 2 are stored in the working memory 16 in a distinguished manner for each mobile phone 2, the mobile phone 2 and the data stored in the working memory 16 may be associated with each other not only by associating them with each other by the method generating the link key but also by another method.

The control unit 12 of the hands-free apparatus 1 receives a responded incoming call history and a non-responded incoming call (missed call) history in a distinguished manner as the incoming call history data from the mobile phone 2; when they are simultaneously displayed in list form, either an iconic figure (a figure that is a combination of a handset and an arrow) representing that it is a responded incoming call or an iconic figure (a figure that is a combination of a handset and a x mark) representing that it is a non-responded incoming call (missed call) may be displayed for each data.

The hands-free apparatus according to the present disclosure can appropriately control data transfer timing when simultaneously connecting to a plurality of mobile phones.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free apparatus comprising:
a memory; and
a hardware processor coupled to the memory, the hardware processor being configured to:
connect to a plurality of mobile phones to enable a hands-free telephone conversation; and
receive at least one data among outgoing call history data, incoming call history data, missed call history data, and phonebook data stored in one mobile phone among the plurality of mobile phones, wherein
the hardware processor is configured to, when receiving the at least one data from the one mobile phone, execute reception of the at least one data from a second mobile phone at a prescribed timing,
the hardware processor is configured to receive the at least one data at the prescribed timing set in accordance with priorities of the one mobile phone and the second mobile phone,
the hardware processor is configured to, when receiving a notification that an outgoing call or an incoming call has been made or received from the second mobile phone while receiving the at least one data from the one mobile phone, and when a priority of the one mobile phone is lower than a priority of the second mobile phone, suspend reception of the at least one data from the one mobile phone, start the reception of the at least one data from the second mobile phone, and resume the reception of the at least one data from the one mobile phone after an end of the reception of the at least one data from the second mobile phone.

2. The hands-free apparatus according to claim 1, wherein the hardware processor is configured to determine the prescribed timing at which the at least one data from the second mobile phone is to be received, in accordance with communication states of the one mobile phone and the second mobile phone.

3. The hands-free apparatus according to claim 2, wherein the hardware processor is configured to, when receiving a notification that an outgoing call or an incoming call has been made or received from the second mobile phone while receiving the at least one data from the one mobile phone, receive the at least one data from the second mobile phone after reception of the at least one data from the one mobile phone has ended.

4. The hands-free apparatus according to claim 1, wherein the hardware processor is further configured to, when the second mobile phone has received an incoming call while the one mobile phone is transferring the at least one data to the hands-free apparatus, execute hands-free telephone conversation processing for the incoming call received by the second mobile phone.

5. The hands-free apparatus according to claim 1, wherein the hardware processor is configured to, when receiving the notification from the second mobile phone while receiving the at least one data from the one mobile phone, and when the priority of the one mobile phone is higher than the priority of the second mobile phone, receive the at least one data from the second mobile phone after reception of the at least one data from the one mobile phone has ended.

6. The hands-free apparatus according to claim 1, wherein the hardware processor is configured to:
when the one mobile phone or the second mobile phone has entered a wireless connection communication range, connect to the one mobile phone or the second mobile phone to enable a hands-free telephone conversation; and
when the second mobile phone has entered the wireless connection communication range and been connected to enable a hands-free telephone conversation while the hardware processor is receiving the at least one data from the one mobile phone, execute the reception of the at least one data from the second mobile phone after reception of the at least one data from the one mobile phone has ended.

7. The hands-free apparatus according to claim 6, wherein the hardware processor is configured to, when the second mobile phone has entered the wireless connection communication range while the hardware processor is receiving the at least one data from the one mobile phone, connect to the second mobile phone to enable a hands-free telephone conversation while continuing reception of the at least one data from the one mobile phone.

8. The hands-free apparatus according to claim 1, wherein the hardware processor is configured to:
when the one mobile phone or the second mobile phone has entered a wireless connection range, connect to the one mobile phone or the second mobile phone to enable a hands-free telephone conversation; and
when the second mobile phone has entered the wireless connection range and connected to enable a hands-free telephone conversation while the hardware processor is receiving the at least one data from the one mobile phone, receive the at least one data at the prescribed timing set in accordance with the priorities.

9. The hands-free apparatus according to claim 8, wherein the hardware processor is configured to, when a priority of the one mobile phone is lower than a priority of the second mobile phone, suspend reception of the at least one data from the one mobile phone, start the reception of the at least one data from the second mobile phone, and resume the reception of the at least one data from the one mobile phone after an end of the reception of the at least one data from the second mobile phone.

10. The hands-free apparatus according to claim 1, wherein the hardware processor is configured to, when receiving a notification that an outgoing call or an incoming call has been made or received, from the second mobile phone while receiving the at least one data from the one mobile phone, receive the at least one data from the second mobile phone concurrently with reception of the at least one data from the one mobile phone.

11. A method of data transfer, comprising:
connecting to a plurality of mobile phones to enable a hands-free telephone conversation; and
receiving at least one data among outgoing call history data, incoming call history data, missed call history data, and phonebook data stored in one mobile phone among the plurality of mobile phones, wherein
at the receiving, reception of the at least one data from a second mobile phone is executed at a prescribed timing when the at least one data from the one mobile phone is being received,
the at least one data is received at the prescribed timing set in accordance with priorities of the one mobile phone and the second mobile phone, and
when receiving a notification that an outgoing call or an incoming call has been made or received from the second mobile phone while receiving the at least one data from the one mobile phone, and when a priority of the one mobile phone is lower than a priority of the second mobile phone, reception of the at least one data from the one mobile phone is suspended, the reception of the at least one data from the second mobile phone is started, and the reception of the at least one data from the one mobile phone is resumed after an end of the reception of the at least one data from the second mobile phone.

12. A non-transitory computer readable medium on which an executable program is recorded, the program instructing a computer to carry out:
connecting to a plurality of mobile phones to enable a hands-free telephone conversation; and
receiving at least one data among outgoing call history data, incoming call history data, missed call history data, and phonebook data stored in one mobile phone among the plurality of mobile phones,
at the receiving, reception of the at least one data from a second mobile phone is executed at a prescribed timing when the at least one data from the one mobile phone is being received,
the at least one data is received at the prescribed timing set in accordance with priorities of the one mobile phone and the second mobile phone, and
when receiving a notification that an outgoing call or an incoming call has been made or received from the second mobile phone while receiving the at least one data from the one mobile phone, and when a priority of the one mobile phone is lower than a priority of the second mobile phone, reception of the at least one data from the one mobile phone is suspended, the reception of the at least one data from the second mobile phone is started, and the reception of the at least one data from the one mobile phone is resumed after an end of the reception of the at least one data from the second mobile phone.

* * * * *